US009152320B2

(12) United States Patent
Roddy

(10) Patent No.: US 9,152,320 B2
(45) Date of Patent: Oct. 6, 2015

(54) PROGRAMMABLE CONTROLLERS AND SCHEDULE TIMERS

(75) Inventor: Ivor Roddy, Dundalk (IE)

(73) Assignee: Climote Limited, Dundalk (IE)

( * ) Notice: Subject to any disclaimer, the term of this patent is extended or adjusted under 35 U.S.C. 154(b) by 0 days.

(21) Appl. No.: 13/640,455

(22) PCT Filed: Apr. 14, 2011

(86) PCT No.: PCT/EP2011/055954
§ 371 (c)(1),
(2), (4) Date: Oct. 10, 2012

(87) PCT Pub. No.: WO2011/128416
PCT Pub. Date: Oct. 20, 2011

(65) Prior Publication Data
US 2013/0027412 A1 Jan. 31, 2013

(30) Foreign Application Priority Data

Apr. 14, 2010 (IE) .................................. S2010/0214

(51) Int. Cl.
*F24F 11/00* (2006.01)
*G06F 3/0488* (2013.01)
(Continued)

(52) U.S. Cl.
CPC ........ *G06F 3/04883* (2013.01); *F24F 11/0086* (2013.01); *G04C 23/345* (2013.01);
(Continued)

(58) Field of Classification Search
None
See application file for complete search history.

(56) References Cited

U.S. PATENT DOCUMENTS 5,929,857 A * 7/1999 Dinallo et al. ................ 715/840

6,595,430 B1 * 7/2003 Shah .......................... 236/46 R
(Continued)

FOREIGN PATENT DOCUMENTS

DE 9320245 3/1994
DE 4302023 7/1994
(Continued)

OTHER PUBLICATIONS

Scheduling On-Off home control devices: Design issues and usability evaluation of four touchscreen interfaces, Nov. 1989, Authors: Catherine Plaisant & Ben Shneiderman, University of Maryland—Department of Computer Science, College Park, MD 20742.*
(Continued)

*Primary Examiner* — Matt Kim
*Assistant Examiner* — Mahelet Shiberou
(74) *Attorney, Agent, or Firm* — Caseiro Burke LLC; Chris A. Caseiro

(57) ABSTRACT

The present invention relates to a user interface system and method for programming a schedule of a programmable device. The system comprises processor means and a display unit coupled to the processor means, whereby the processor means is configured to provide a graphical display on the display unit for displaying a time select region for programming at least one time period for the schedule. The time select region is displayed on the display unit as a dial (350) divided into a plurality of segments and each segment represents a period of time in a day, such as fifteen minutes, for an operating parameter, such as a temperature setting for the device. The time select region is interactively operable (354) to enable a user to select one or more segments (351) on the dial to correspond to a selected time period for the schedule. The present invention is directed to a user interface system and method that allows adjustment of multiple schedules in an easy and efficient manner allowing a user to easily view and switch between schedules.

24 Claims, 41 Drawing Sheets

(51) Int. Cl.
*G04C 23/34* (2006.01)
*G04G 15/00* (2006.01)
*G06F 3/0486* (2013.01)
*G06F 3/0362* (2013.01)
*G06F 3/0484* (2013.01)

(52) U.S. Cl.
CPC ............ *G04G15/006* (2013.01); *G06F 3/0362* (2013.01); *G06F 3/0486* (2013.01); *G06F 3/04847* (2013.01)

(56) References Cited

U.S. PATENT DOCUMENTS

| | | | |
|---|---|---|---|
| 6,601,988 | B2 * | 8/2003 | Molander ................. 368/187 |
| D507,976 | S | 8/2005 | Roher et al. |
| 7,114,554 | B2 * | 10/2006 | Bergman et al. .............. 165/238 |
| 7,181,317 | B2 * | 2/2007 | Amundson et al. ........... 700/276 |
| 7,306,165 | B2 * | 12/2007 | Shah .......................... 236/46 R |
| 7,744,008 | B2 * | 6/2010 | Chapman et al. ............... 236/51 |
| 7,890,195 | B2 * | 2/2011 | Bergman et al. ................ 700/17 |
| 8,387,891 | B1 * | 3/2013 | Simon et al. .................. 236/46 R |
| 8,442,695 | B2 * | 5/2013 | Imes et al. .................... 700/276 |
| 2001/0055244 | A1 | 12/2001 | Kim |
| 2004/0262410 | A1 * | 12/2004 | Hull ............................ 236/91 R |
| 2005/0119765 | A1 * | 6/2005 | Bergman et al. ................ 700/16 |
| 2005/0119793 | A1 * | 6/2005 | Amundson et al. ........... 700/276 |
| 2005/0194457 | A1 * | 9/2005 | Dolan ............................ 236/51 |
| 2007/0094598 | A1 * | 4/2007 | Nakai et al. .................. 715/703 |
| 2008/0048046 | A1 * | 2/2008 | Wagner et al. .............. 236/91 R |
| 2008/0207274 | A1 * | 8/2008 | Kim ............................... 455/566 |
| 2009/0062964 | A1 * | 3/2009 | Sullivan et al. .............. 700/276 |
| 2010/0023865 | A1 | 1/2010 | Fulker et al. |
| 2010/0058189 | A1 | 3/2010 | Daffner et al. |
| 2010/0107076 | A1 * | 4/2010 | Grohman et al. ............ 715/709 |
| 2010/0107103 | A1 * | 4/2010 | Wallaert et al. .............. 715/771 |
| 2010/0107110 | A1 * | 4/2010 | Mirza et al. .................. 715/777 |
| 2012/0066629 | A1 * | 3/2012 | Lee et al. ...................... 715/769 |

FOREIGN PATENT DOCUMENTS

| | | |
|---|---|---|
| EP | 0889391 | 1/1999 |
| EP | 1956446 | 8/2008 |
| EP | 2071417 | 6/2009 |
| FR | 2779894 | 12/1999 |
| JP | 57206888 | 12/1982 |
| WO | 2006111481 | 10/2006 |

OTHER PUBLICATIONS

EQ3 Electronic Equipment, Operating Manual Radio energy-saving controller for radiators, Jun. 30, 2009, 68 pp.
International Search Report and Written Opinion of the International Searching Authority in PCT application PCT/EP2011/055954, Nov. 24, 2011, 23 pp.
Written Opinion of the International Preliminary Examining Authority in PCT application PCT/EP2011/055954, May 14, 2012, 10 pp.
International Preliminary Report on Patentability in PCT application PCT/EP2011/055954, Aug. 7, 2012, 9 pp.

* cited by examiner

PROGRAMMABLE CONTROLLERS AND SCHEDULE TIMERS

The present invention relates generally to the field of programmable controllers and schedule timers for any electrically controlled device. More specifically, the present invention relates to a simplified graphical user interface (GUI) and method of programming controllers.

Controllers and timers are used on a wide variety of devices and systems for controlling various functions in homes and/or buildings and their related grounds. Some controllers have schedule programming that modifies device parameter set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

Schedule timers, for example, are employed to control various devices within a home, in order to maximise HVAC.

For efficiency and to minimise complexity a typical home will require three separate schedules. One schedule for when the living area is occupied, separate schedule for when the sleeping area is occupied and one for domestic hot water. These three schedules also vary from day to day to suit people's lifestyles. To obtain maximum efficiency this requires the setting the three individual schedules for each day of the week, resulting in a total of twenty one timer schedules for each home.

Currently HVAC controllers can be grouped into four main categories. These are mechanical timers, digital timers, digital multi zone timers and programmable controllers.

Mechanical timers are typically single zone 24-hour analogue dial type timer switch with manual push/pull pins divided into half hour segments. They are widely used because of their basic functionality. They are relatively straightforward to operate with visible indication of scheduled times. However, because they are limited to 24 hour, they are not efficient at managing the schedules of current homeowner. There time setting can be confusing and not very accurate. Pins can easily be lost or broken. The schedule can be difficult to set due to the close proximity of the pins and the correct time can easily be affected when setting a new schedule. They have lots of moving parts, which can wear out or break. And they have little ability be remotely controlled or set.

Digital controllers may include a feature that allows the user to set a separate schedule for weekday and weekend use, or to copy the settings for a particular day and then apply them towards other selected days of the week. While these designs allow the user to copy settings from one day to another, a number of steps are often required to establish a program, adding to the complexity of the interface. In some cases, the interface may not permit the user to select multiple days outside of the normal weekday/weekend scheme. In other cases, the interface is simply too complex to be conveniently used to program and is simply by-passed or not programmed by the user especially if it has multi zone capabilities. Accordingly, there is an ongoing need in the art to decrease the time and complexity associated with programming a multi-day and/or multi zone schedule in a programmable controller.

Programmable controllers monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modem thermostats for use in the home, a controller unit equipped with temperature and humidity sensing capabilities may be provided to interact with a heater, blower, flue vent, air compressor, humidifier and/or other components, to control the temperature and humidity levels at various locations within the home. A sensor located within the controller unit and/or one or more remote sensors may be employed to sense when the temperature or humidity reaches a certain threshold level, causing the controller unit to send a signal to activate or deactivate one or more component in the system.

It is a therefore an object of the present invention to provide a less complex user interface system and method for programming schedules for a programmable device which goes at least some way toward overcoming the above problems and/or which will provide the public and/or industry with a useful alternative.

According to the invention, there is provided a user interface system for programming a schedule of a programmable device, the user interface system comprising:

processor means;

a display unit coupled to the processor means;

the processor means configured to provide a graphical display on the display unit;

a time select region for programming at least one time period for the schedule, the time select region displayed on the display unit as a dial divided into a plurality of segments, each segment representing a period of time in a day for an operating parameter of the device; and the time select region being interactively operable to enable a user to select one or more segments on the dial, in which the selected one or more segments correspond to a first time period for the schedule and any unselected segments correspond to a further time period for the schedule.

In another embodiment of the invention, the one or more segments are selected by a user positioning and dragging pointing means over unselected segments of the dial.

In another embodiment of the invention, the one or more segments are deselected by a user positioning and dragging pointing means over one selected segments of the dial.

In another embodiment of the invention, the display unit is a touch sensitive screen and the pointing means is provided by a finger of a user or a stylus such that segments are selected or unselected by a user touching and dragging the finger or stylus over segments of the dial.

In another embodiment of the invention, the pointing means is a mouse and segments are selected or unselected by a user positioning, activating and dragging a mouse pointer over segments of the dial.

In another embodiment of the invention, the pointing means is provided by a manually rotatable selection device, and segments are selected or unselected by a user positioning, activating and dragging a pointer of the selection device over segments of the time select region.

In another embodiment of the invention, a segment is selectable and/or unselectable to set and indicate a state for the operating parameter of the device.

In another embodiment of the invention, a selected segment represents an on state and an unselected segment represents an off state for the operating parameter of the device.

In another embodiment of the invention, each segment has a background colour or appearance which indicates a time of use price for the operating parameter. Such a feature will enable a consumer to be made aware of the costs of programming heating or other operating parameters at particular times of the day or week. For example, a red colour may be used to indicate a peak rate, and other colours used to indicate night time or day rate charges. Accordingly, consumers may select certain segments of the time select region to avoid on times which might fall within the peak or expensive rate times.

In another embodiment of the invention, the operating parameter is one of: room temperature, room humidity, room venting, room air quality, water temperature, water quality, water regulation, alarm or security setting and light level.

In another embodiment of the invention, the segments change appearance when selected and deselected.

In another embodiment of the invention, each segment corresponds to a specific period of time within the range of one of: one hour to twenty four hours of a day, thirty minutes to an hour of a day, fifteen minutes to thirty minutes of a day and one minute to fifteen minutes of a day.

In another embodiment of the invention, the time select region is operable for programming a plurality of time periods in a day, whereby each distinct time period for the operating parameter corresponds to adjacent selected or adjacent unselected segments on the dial.

In another embodiment of the invention, a time period is additionally displayed in a numerical format on the display unit.

In another embodiment of the invention, a time period in the numerical format is displayed as a start and stop time on the display unit.

In another embodiment of the invention, a time period is updated by editing the start and stop time on the numerical format.

In another embodiment of the invention, segments of the dial are selected or deselected according to the edited time period.

In another embodiment of the invention, the processor means is further configured to display graphically on the display unit a temperature setting region.

In another embodiment of the invention, the temperature setting region is interactively operable to enable a target temperature to be set for a time period.

In another embodiment of the invention, the target temperature and current temperature is displayed in or adjacent the dial.

In another embodiment of the invention, the processor means is further configured to display graphically on the display unit a day select region which is interactively operable to enable a user to select one or more days in a week for which a schedule is to be programmed.

In another embodiment of the invention, the processor means is further configured to display graphically on the display unit a zone select region which is interactively operable to enable a user to select from one or more zones for which a schedule is to be programmed.

In another embodiment of the invention, the processor means is further configured to display graphically on the display unit a zone select region which is interactively operable to enable a user to select from two or more zones for which a schedule is to be programmed.

In another embodiment of the invention, the processor means is further configured to display graphically on the display unit a zone select region which is interactively operable to enable a user to select from three or more zones for which a schedule is to be programmed.

In another embodiment of the invention, each zone has a separate dial on the display unit.

In another embodiment of the invention, a plurality of zones are displayed as an arrangement of concentric dials on the display unit.

In another embodiment of the invention, a schedule is displayed as a dial for each zone on the display unit.

In another embodiment of the invention, a schedule is displayed as a dial for each day of a week on the display unit.

In another embodiment of the invention, a schedule is displayed as a dial for each zone for each day of a week, month or season on the display unit.

In another embodiment of the invention, the processor is coupled to local or remote storage means, whereby one or more programmed schedules are stored in and selectable from the storage means for processing by the device.

In another embodiment of the invention, a schedule is programmed by accessing the user interface system via an Internet website.

In another embodiment of the invention, a schedule is programmed by accessing the user interface system via an application executing on a mobile computing device.

In another embodiment of the invention, a schedule is programmed by accessing the user interface system on a control panel for the device.

In another embodiment of the invention, the user interface system further comprises means for receiving a text message encoding a schedule from a computing device.

In another embodiment of the invention, the text message comprises an alpha-numeric string of characters, whereby each character in the string encodes an instruction to select or unselect a segment of the dial.

In another embodiment of the invention, the processor means comprises means to sense energy flowing through the programmable device in a time period defined by selected and/or unselected segments.

In such an embodiment a sensing means for monitoring the current being drawn through the schedule controller to the scheduled devices is provided to establish if the scheduled devices are active or inactive such as, for example a heating device that burns fuel is active and draws a higher current until it reaches a predetermined temperature at which point a thermostat renders it inactive for a period of time where it draws a lower or no current until it cools down to a minimum predetermined temperature whereupon a thermostat allows it to active again and the cycle restarts. The present invention thus allows the processor means to count for example the amount of time that a scheduled device was active over a given time period also the number of cycles that occur over a given time period. This information can then be displayed on any of the user interface display units available to the processor means.

In another embodiment of the invention, the processor means can display graphically or numerically on any of the user interface display units available to the processor means the amount of a substance used for a given time period by multiplying the amount of time that the scheduled device was sensed to be active by the scheduled devices active usage rate for that substance.

In another embodiment of the invention, the processor means can calculate a substance usage rate for a device connected to it for example by sensing how long a active oil burner takes to empty a known quantity of oil then the processor will divide the number of liters by the number of hours and display the liters/hour rate for the active burner. This information can then be displayed on any of the user interface display units available to the processor means.

In another embodiment of the invention, the processor means can calculate a substance usage rate for a device connected to it for example by starting with a full or referenced oil tank level then sensing the amount of active burn time between refills, then measuring the amount of oil it takes to replenish the tank to the full or referenced level. The processor will divide the number of liters by the number of hours and display the liters/hour rate for the active burner. This information can then be displayed on any of the user interface display units available to the processor means.

In another embodiment of the invention the processor means can calculate the energy usage rates of an electrical device connected to it for example by sensing the actual current drawn through the schedule controller's current sensor. This information can then be displayed on any of the user interface display units available to the processor means.

According to the invention, there is provided a method of programming a schedule of a programmable device using a user interface system comprising processor means and a display unit coupled to the processor means, the processor means configured to provide a graphical display on the display unit comprising a time select region for programming at least one time period for the schedule, the time select region displayed on the display unit as a dial divided into a plurality of segments, each segment representing a period of time in a day for an operating parameter of the device, and the method comprises a steps of:

selecting one or more segments on the dial, in which the selected one or more segments correspond to a first time period for the schedule and any unselected segments correspond to a further time period for the schedule.

In another embodiment of the invention, the step of selecting one or more segments of the dial comprises a user positioning and dragging pointing means over unselected segments of the dial.

In another embodiment of the invention, the step of deselecting one or more segments of the dial involves a user positioning and dragging pointing means over selected segments of the dial.

In another embodiment of the invention, the display unit is a touch sensitive screen and the pointing means is a finger of a user or a stylus, and the step of selecting or deselecting segments comprises a user touching and dragging the finger or stylus over segments of the dial.

In another embodiment of the invention, the pointing means is a mouse and segments are selected or deselected by a user positioning, activating and dragging a mouse pointer over segments of the dial.

In another embodiment of the invention, the pointing means is provided by a manually rotatable selection device, and the step of selecting or deselecting a segment comprises a user positioning, activating and dragging a pointer of the selection device over segments of the time select region.

In another embodiment of the invention, the method comprises a further step of programming a plurality of time periods in a day on the time select region, whereby each distinct time period for the operating parameter corresponds to adjacent selected or adjacent unselected segments on the dial.

In another embodiment of the invention, the method comprises a further step of editing a start and stop time for the time period on a numerical format additionally displayed on the display unit.

In another embodiment of the invention, the method comprises a further step of setting a target temperature for a time period on an interactive temperature setting region displayed graphically on the display unit.

In another embodiment of the invention, the method comprises a further step of selecting one or more days in a week for which a schedule is to be programmed by interacting with a day select region displayed graphically on the display unit.

In another embodiment of the invention, the method comprises a further step of selecting one or more zones for which a schedule is to be programmed by interacting with a zone select region displayed graphically on the display unit.

In another embodiment of the invention, the method comprises a further step of selecting two or more zones for which a schedule is to be programmed by interacting with a zone select region displayed graphically on the display unit.

In another embodiment of the invention, the method comprises a further step of selecting three or more zones for which a schedule is to be programmed by interacting with a zone select region displayed graphically on the display unit.

In another embodiment of the invention, the method comprises a further step of selecting a programmed schedule from local or remote storage means for processing by the device.

In another embodiment of the invention, the method comprises a further step of programming the schedule by accessing the user interface system via an Internet website.

In another embodiment of the invention, the method comprises a further step of programming the schedule by accessing the user interface system via an application executing on a mobile computing device.

In another embodiment of the invention, the method comprises a further step of programming the schedule by accessing the user interface system via a control panel for the device.

In another embodiment of the invention, the method comprises a further step of receiving a text message encoding a schedule from a computing device.

According to a further aspect of the invention, there is provided a user interface system for programming a schedule of a programmable unit of HVAC equipment, the user interface system comprising:

processor means;
a display unit coupled to the processor means;
the processor means configured to provide a graphical display on the display unit;
a time select region for programming at least one time period for the schedule, the time select region displayed on the display unit as a dial divided into a plurality of segments, each segment representing a period of time in a day for a temperature setting of the unit; and
the time select region being interactively operable to enable a user to select one or more segments on the dial, in which the selected one or more segments correspond to a an on time period for the temperature setting and any unselected segments correspond to an off time period for the temperature setting.

According to a further aspect of the invention, there is provided a method of programming a schedule of a programmable unit of HVAC equipment using a user interface system comprising processor means and a display unit coupled to the processor means, the processor means configured to provide a graphical display on the display unit comprising a time select region for programming at least one time period for the schedule, the time select region displayed on the display unit as a dial divided into a plurality of segments, each segment representing a period of time in a day for a temperature setting of the unit, and the method comprises a steps of:

selecting one or more segments on the dial, in which the selected one or more segments correspond to an on time period for the temperature setting and any unselected segments correspond to an off time period for the temperature setting.

According to a further aspect of the invention, there is provided a computing device executing a user interface system as described in any of the above embodiments.

The present invention is generally directed to a control system and interface that allows adjustment of multiple schedules in programmable controllers, associated with a user interface, such as a graphical user interface (GUI), in an easy and efficient manner, the control allowing a user to easily view and switch between schedules.

By using a visual interface control mechanism, such as the rotary slider control, a time-based scaling of a given view can be easily switched between predefined time settings, the present invention pertains to simplified interfaces for setting programmable controller schedules using dial type graphical user interface.

According to an embodiment of the invention the graphical user interface can be accessed from the controllers own user interface.

According to an embodiment of the invention the graphical user interface can be accessed remotely by a computer or cell phone.

The above summary of the present invention is not intended to describe each disclosed embodiment or every implementation of the present invention. The figures, detailed description and examples which follow more particularly explain these embodiments.

The invention may be more completely understood in consideration of the following detailed description of various embodiments of the invention in connection with the accompanying drawings, in which.

Figure 4A:
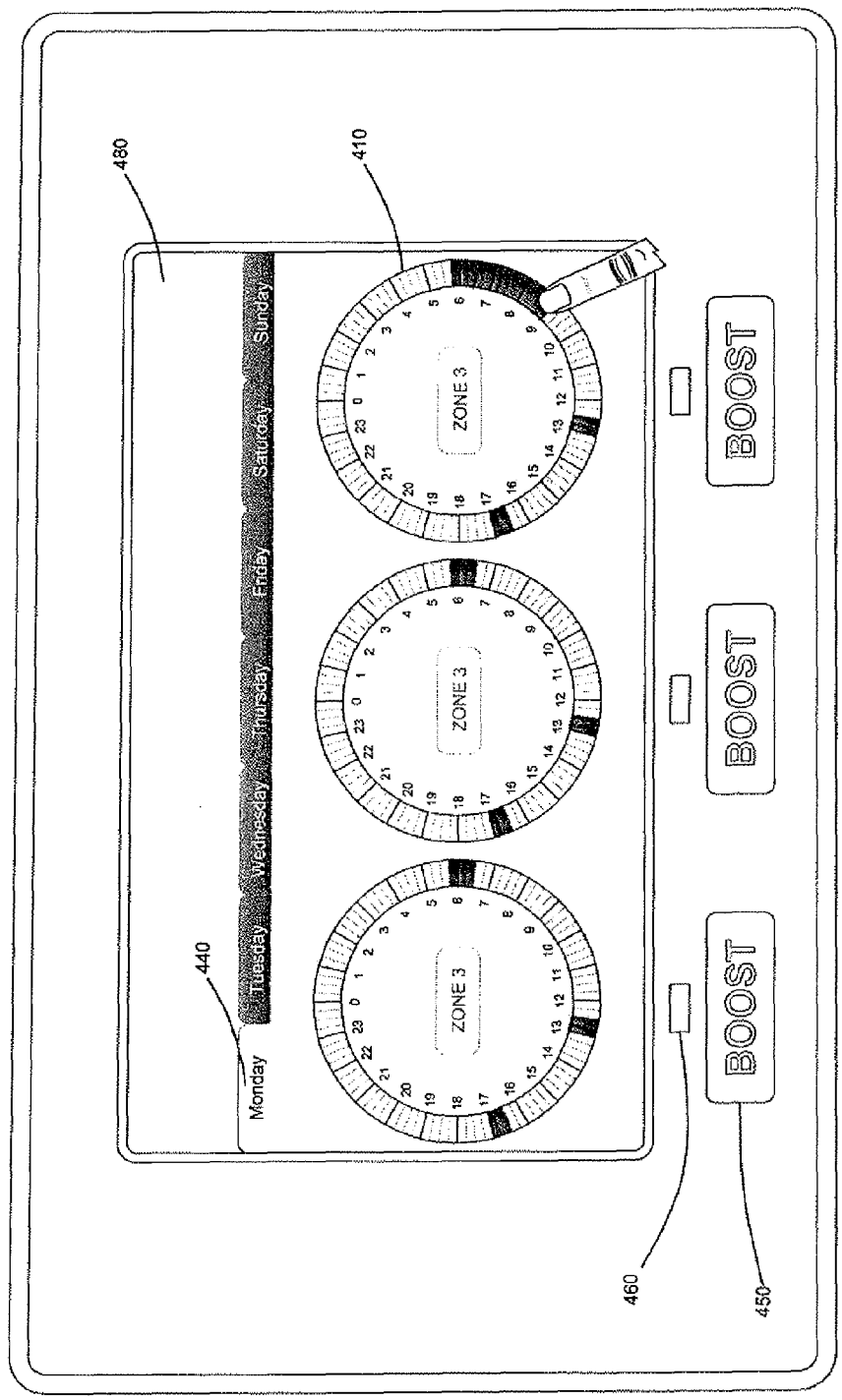
Figure 4B:
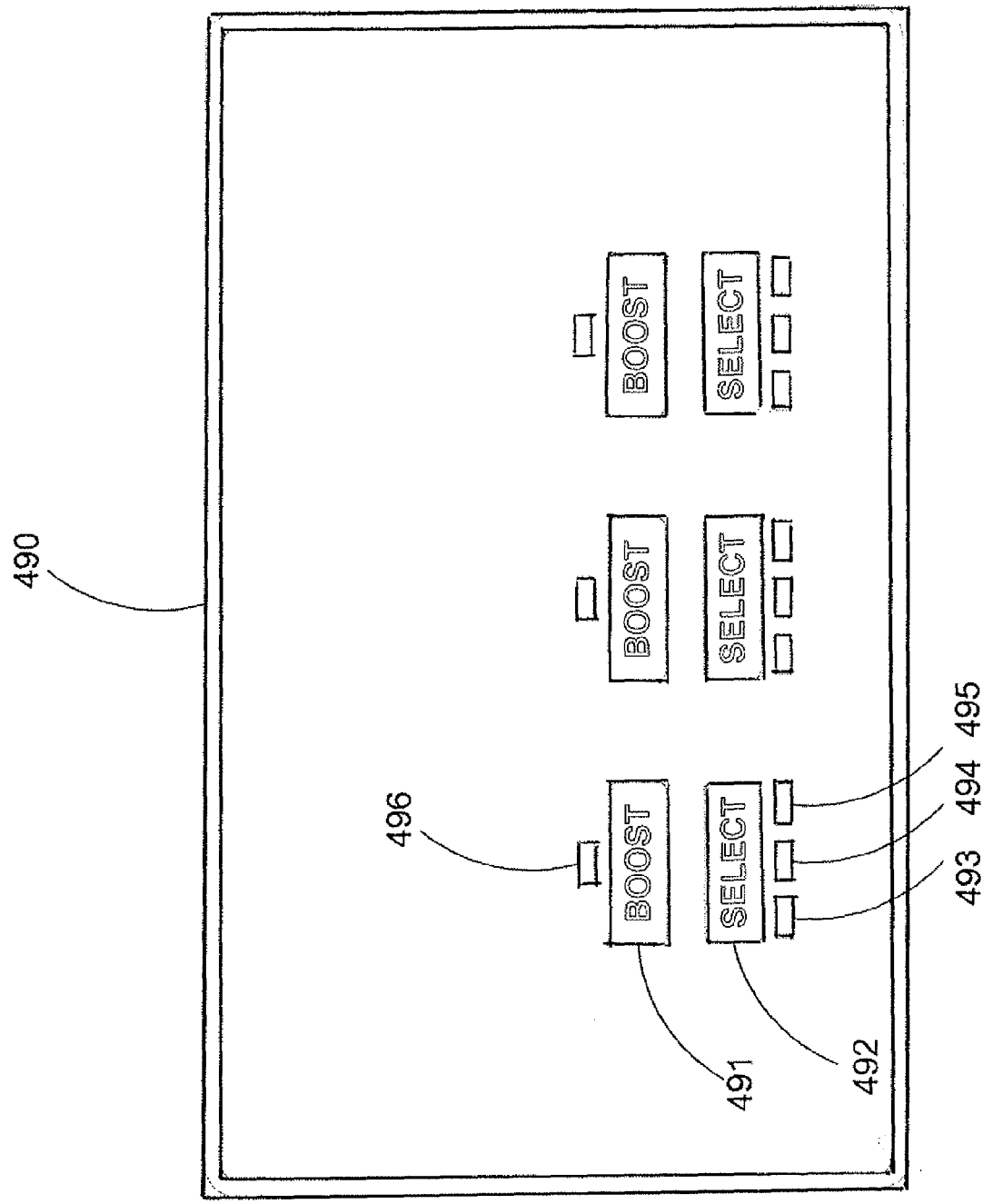
Figure 5A:
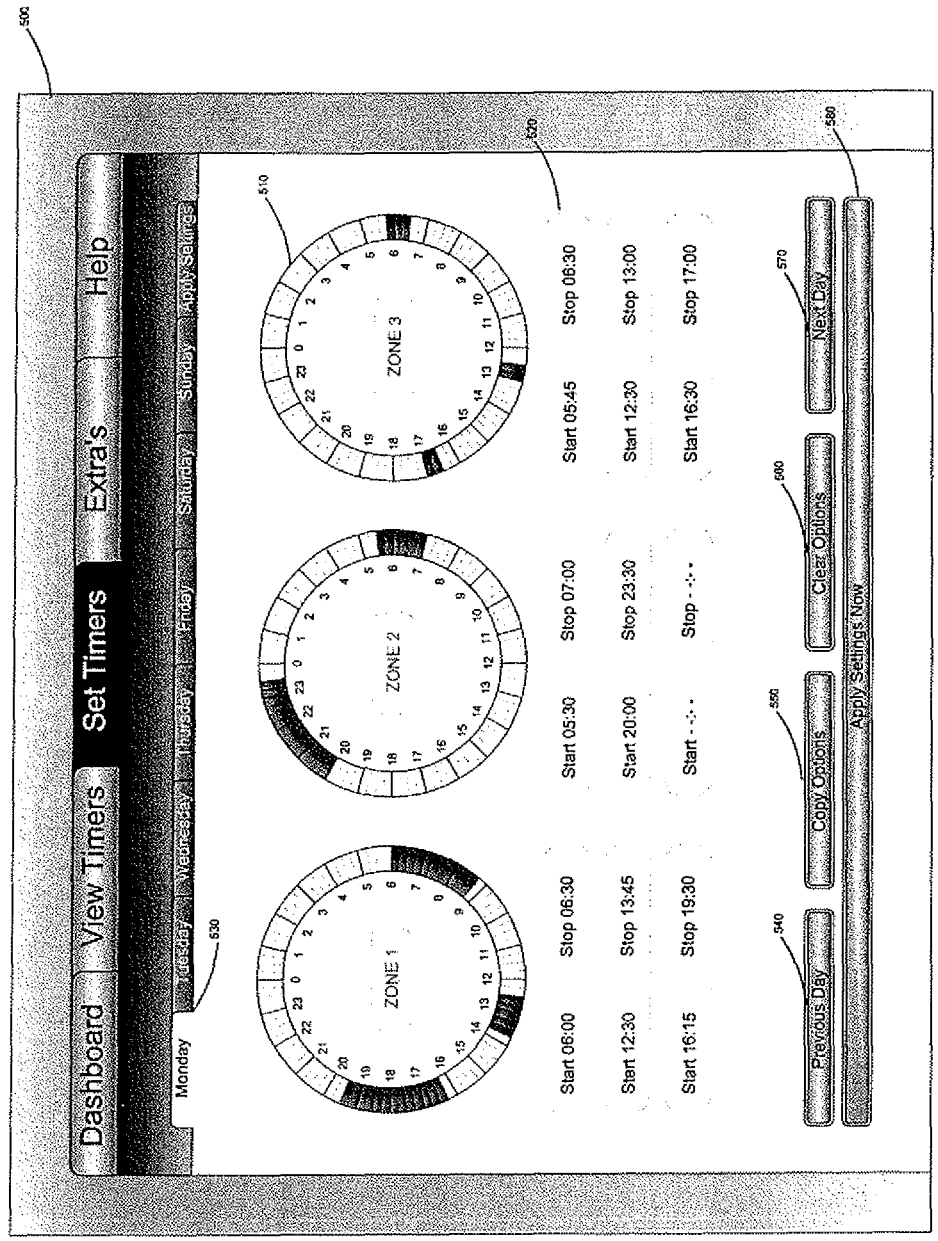
Figure 5B:
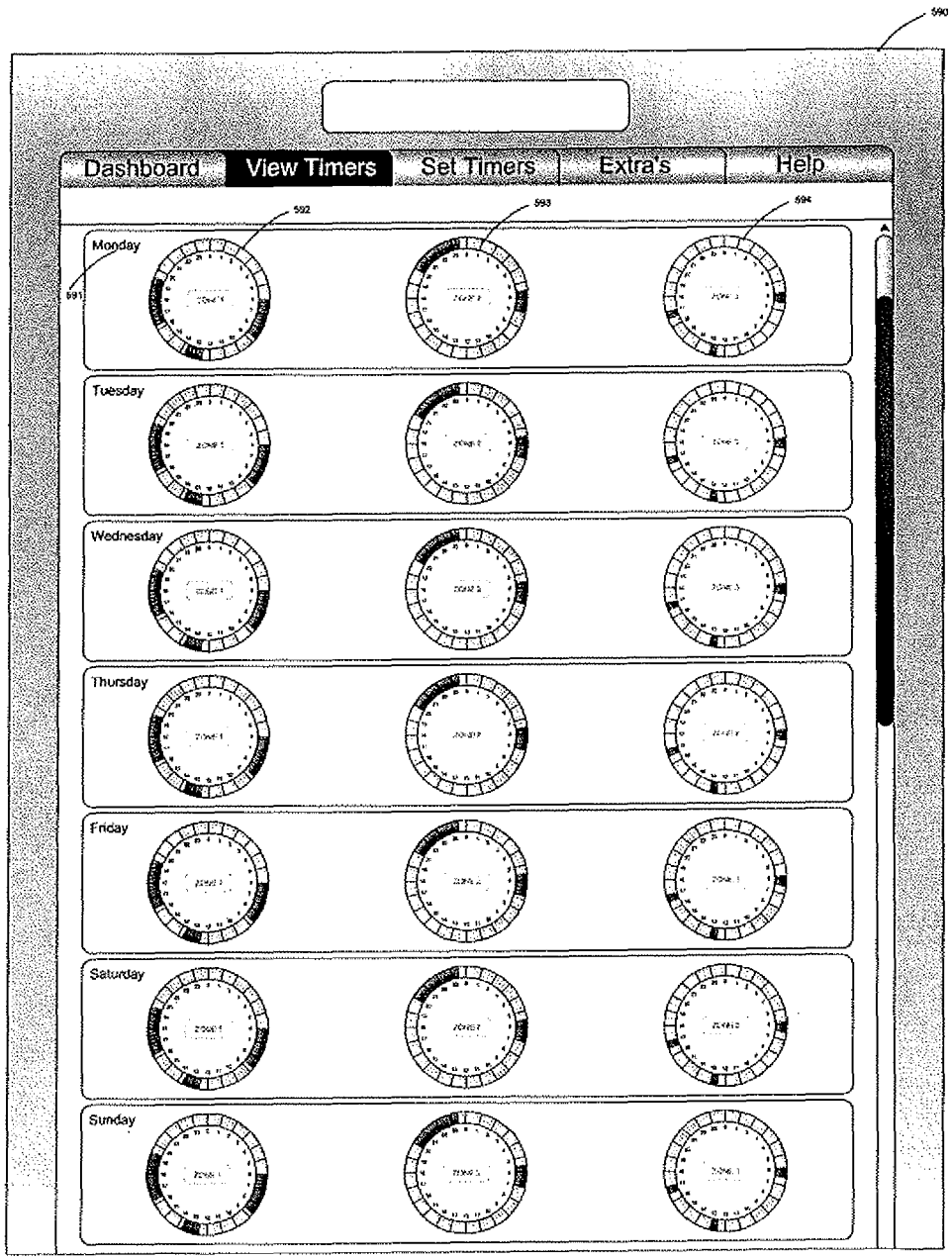
Figure 6:
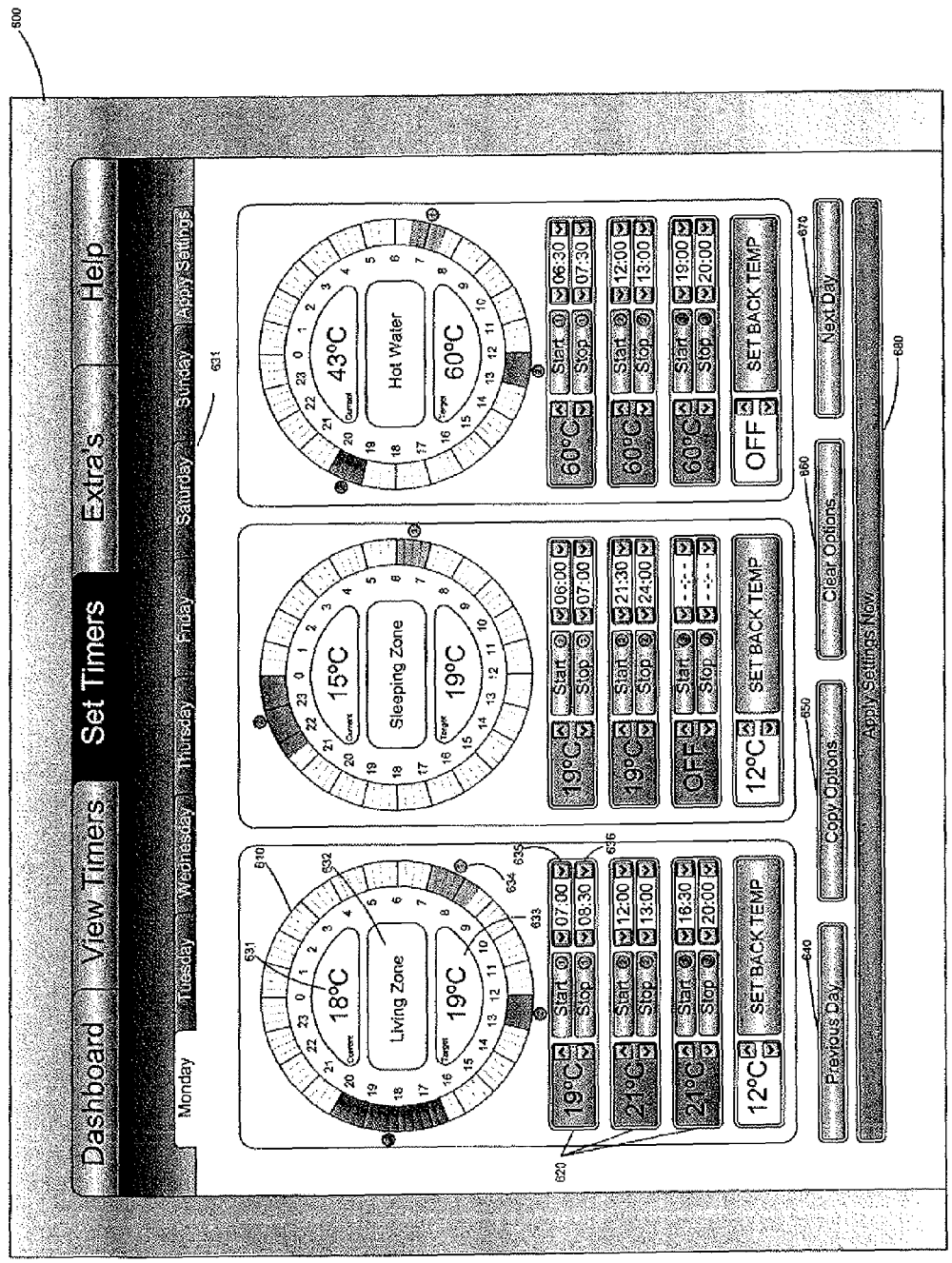
Figure 7:
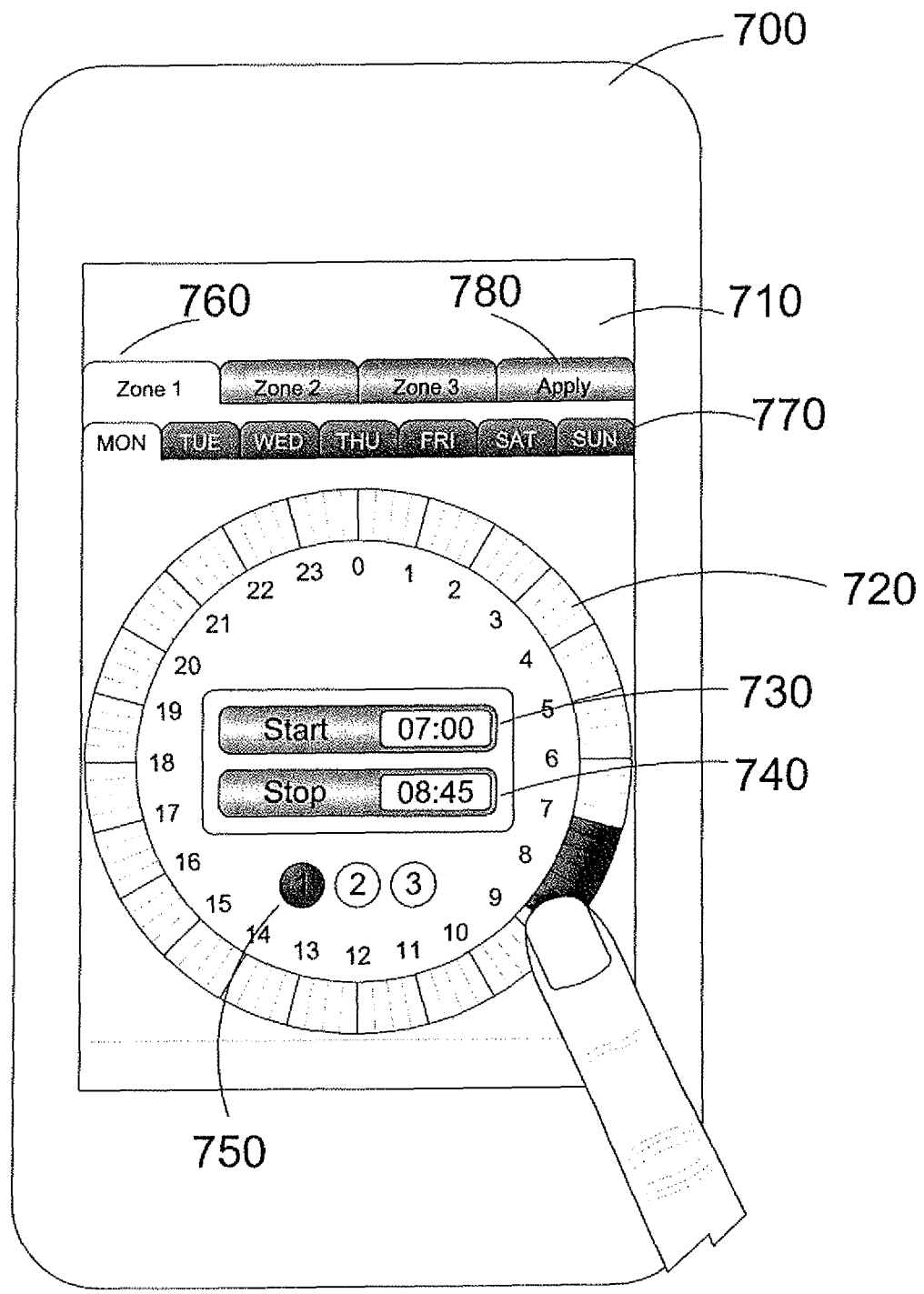
Figure 8:
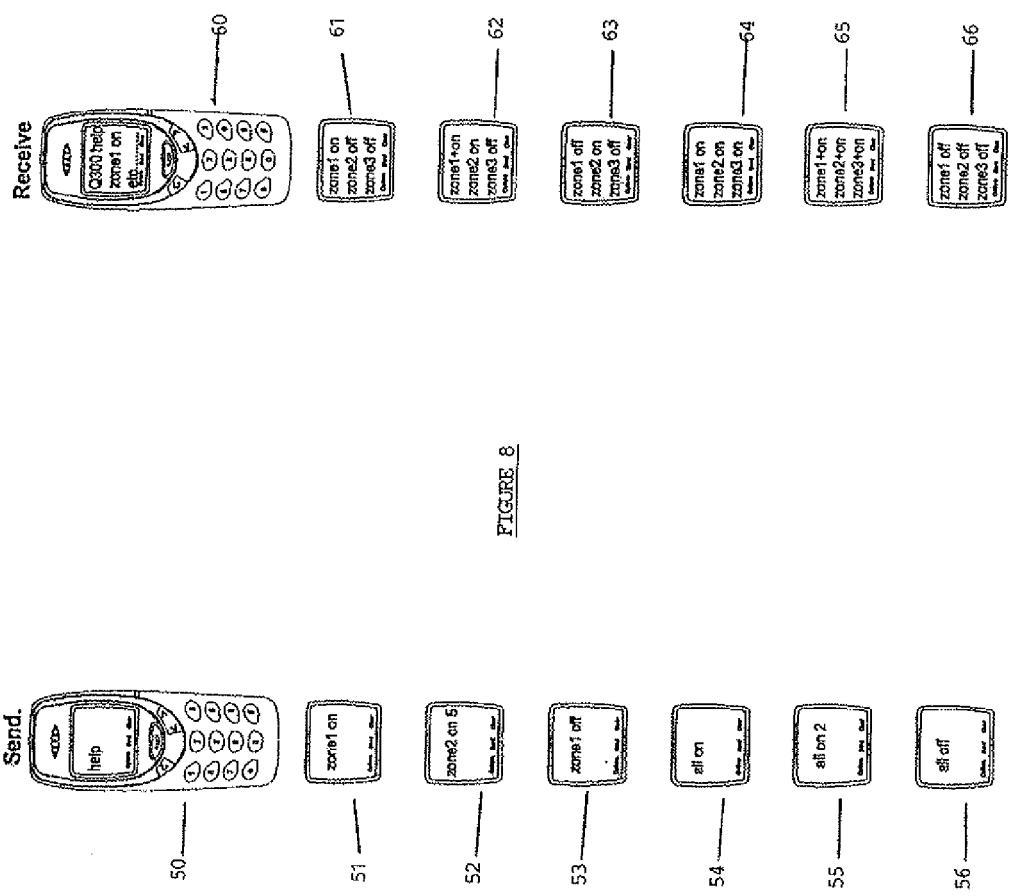
Figure 9:
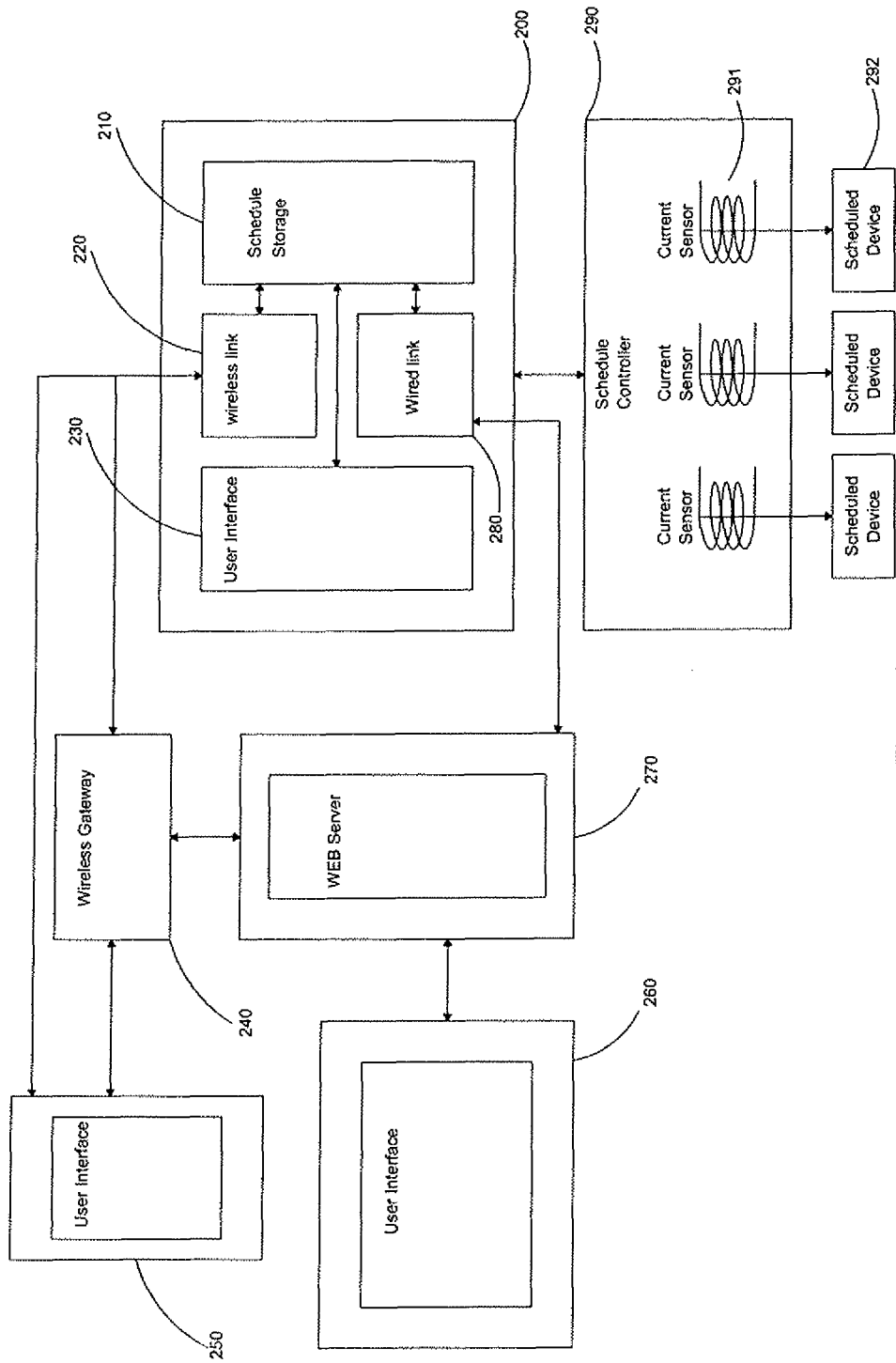
Figure 10:
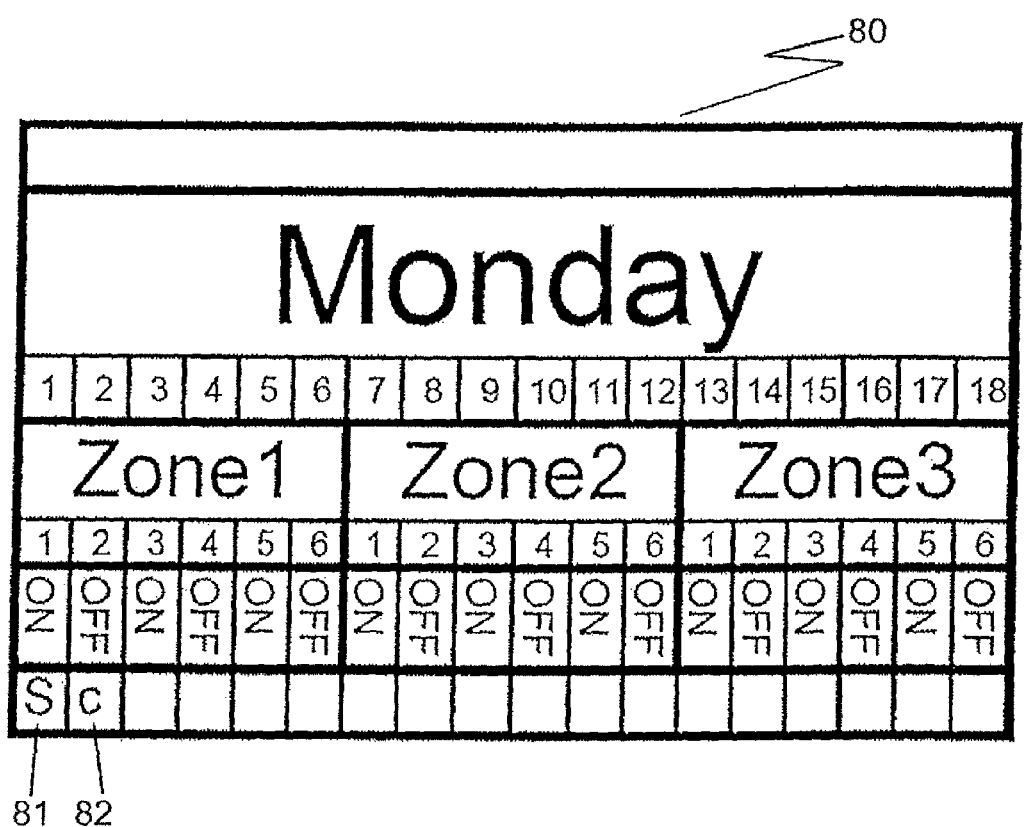

FIGS. 3A-H shows illustrative drawings of schedule timers according to one embodiment of the invention;

FIGS. 4A-B shows illustrative drawings of touch type schedule timers according to one embodiment of the invention;

FIGS. 5A-B shows illustrative screen shots of schedule timers according to one embodiment of the invention;

FIG. 6 shows illustrative screen shots of programmable controllers according to one embodiment of the invention;

FIG. 7 shows illustrative screen shots of mobile type user interface according to one embodiment of the invention;

FIG. 8 is a schematic view illustrating a number of sample commands that may be sent by a user in a text message;

FIG. 9 is block schematic of a system implementing means for sensing energy flowing through the programmable device in accordance with the present invention;

FIG. 10 is a tabular representation of how the instructions for one day are arranged in the three zones in an SMS message, and FIGS. 11 to 32 show a control panel device executing the user interface of the present invention.

The following description should be read with reference to the drawings, in which elements in different drawings are numbered. The drawings, which are not necessarily to scale, depict selected embodiments and are not intended to limit the scope of the invention. Although examples are illustrated for the various elements, those skilled in the art will recognize that many of the examples provided have suitable alternatives that may be utilized.

Generally, the present invention pertains to simplified interfaces for controllers having a dial type GUI programming capabilities. These controllers can be used in a variety of systems such as, for example, HVAC systems, water heater systems, water softener systems, sprinkler systems, security systems, lighting systems, and the like. In the following description reference to a programmable device should be understood to be a class of device for which a schedule is able to be programmed to regulate the operation of some characteristic, variable or operating parameter thereof, and although the figures depict HVAC controllers for exemplary purposes only the present invention is not so limited, although an appreciation of various aspects of the invention will be gained through a discussion of the examples provided below. It will also be understood that the user interface system of the present invention may be implemented via a web-site, a mobile telephone or computing device application or a separate control panel device coupled to the programmable device for which the schedule is to be created.

Figure 1:
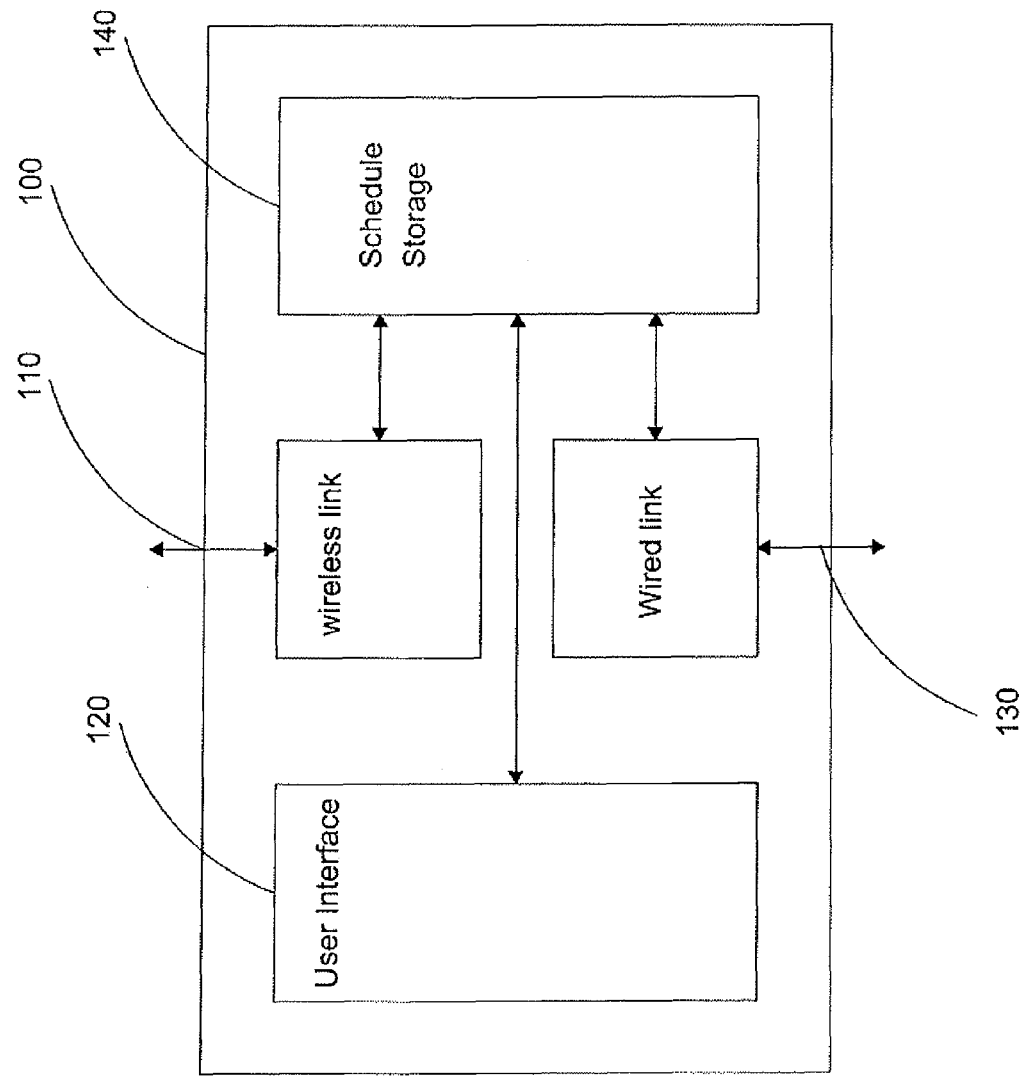
FIG. 1 shows a block diagram of the hardware used according to an embodiment of the invention.

FIG. 1 shows a schedule controller 100 including the user interface 120 which is typically a touch screen. With this GUI you can set up and store new schedules in the schedule storage device 140 or it can read stored schedules out of the storage device 140 that have been sent over the wireless link 110 or the wired link 130.

Figure 2:
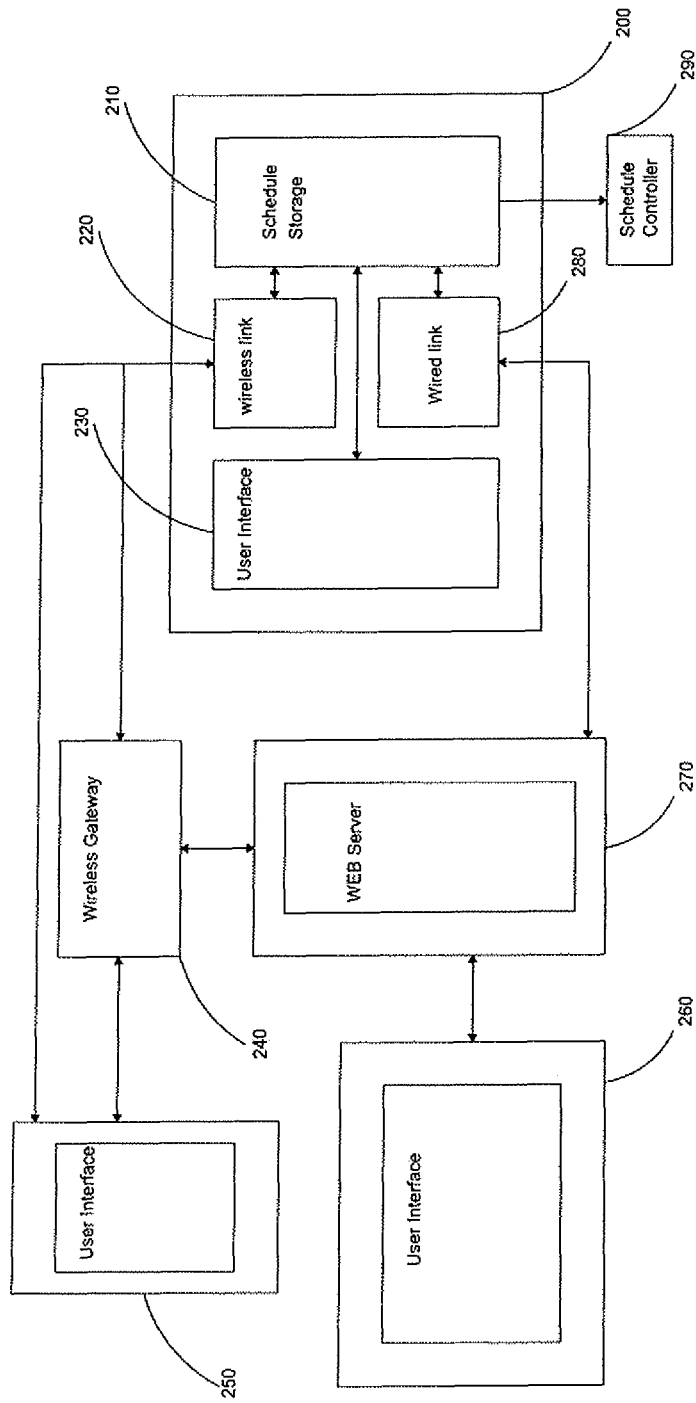
FIG. 2 shows a block diagram of the additional hardware that can be used according to an embodiment of the invention.

FIG. 2 shows the programme controller 200 including the user interface 120 and the remote user interfaces that are available which include web server 270 witch has a portal that can be accessed from a user interface PC 260 to send, set up and store new schedules remotely in to the schedule storage device 140 or it can read stored schedules out for analysis. FIG. 2 also shows the wire less gateway 240 option and the direct link to the mobile network 250.

Figure 3A:
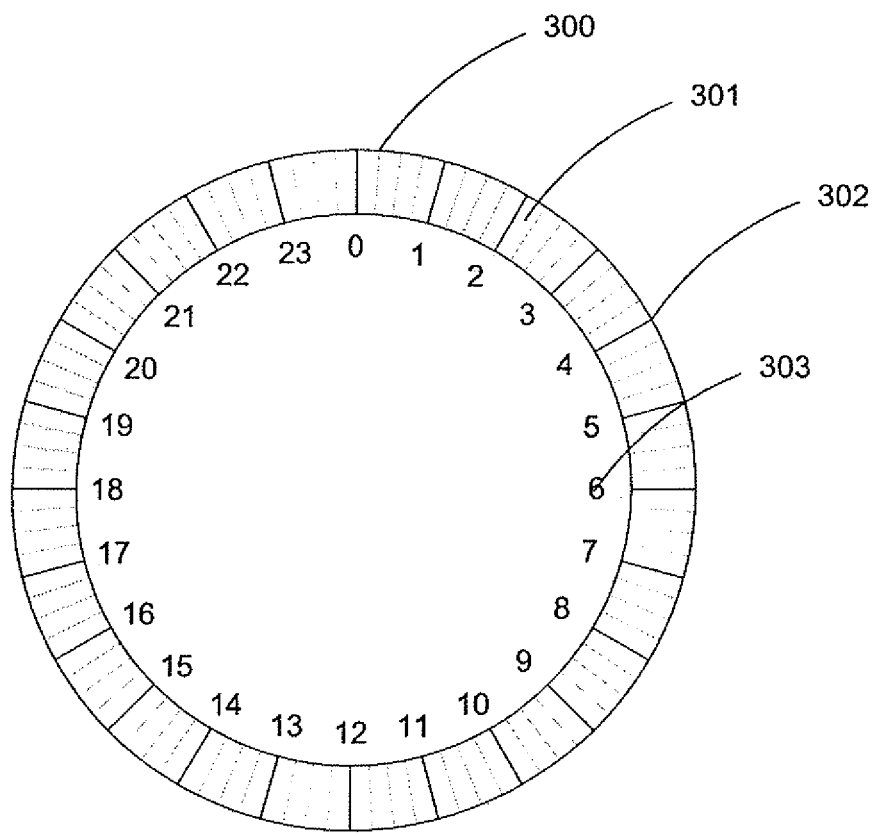

FIG. 3A shows a digitally displayed analogue dial type timer switch 300. Such a dial provides a time select region which is displayed on a display unit for the user interface system. It represents one full 24-hour day. This full day is typically divided into ninety-six equal parts, each part represents single 15-minute segment 301. Every fourth segment 302 has a highlighted line 303, which represents a full hour. Beside each of these lines is the appropriate digit 304 for the hour it represents. The dial is thus divided into segments where each segment represents a period of time in a day for an operating parameter of the device.

Figure 3B:
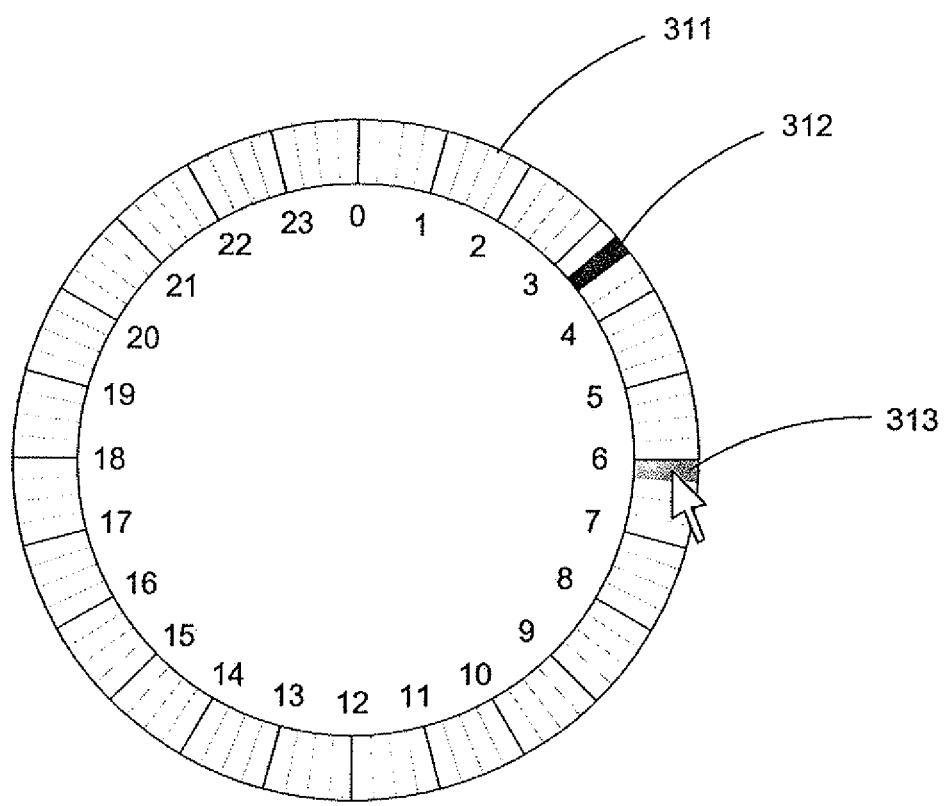

FIG. 3B shows that the segments can be manipulated to represent a number of different states. For example 311 is blank and represents the off state, 312 is filled with a solid colour and represents the on state. While 313 is lightly shaded and represents a segment that is directly below the cursors.

Figure 3C:
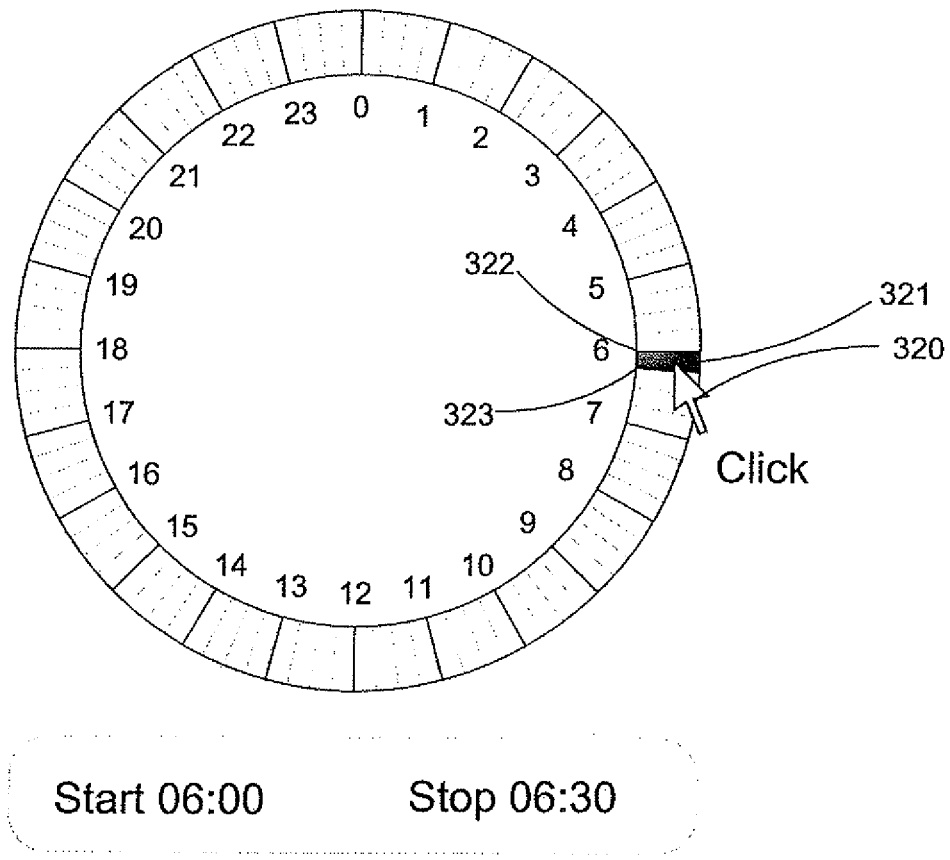
Figure 3D:
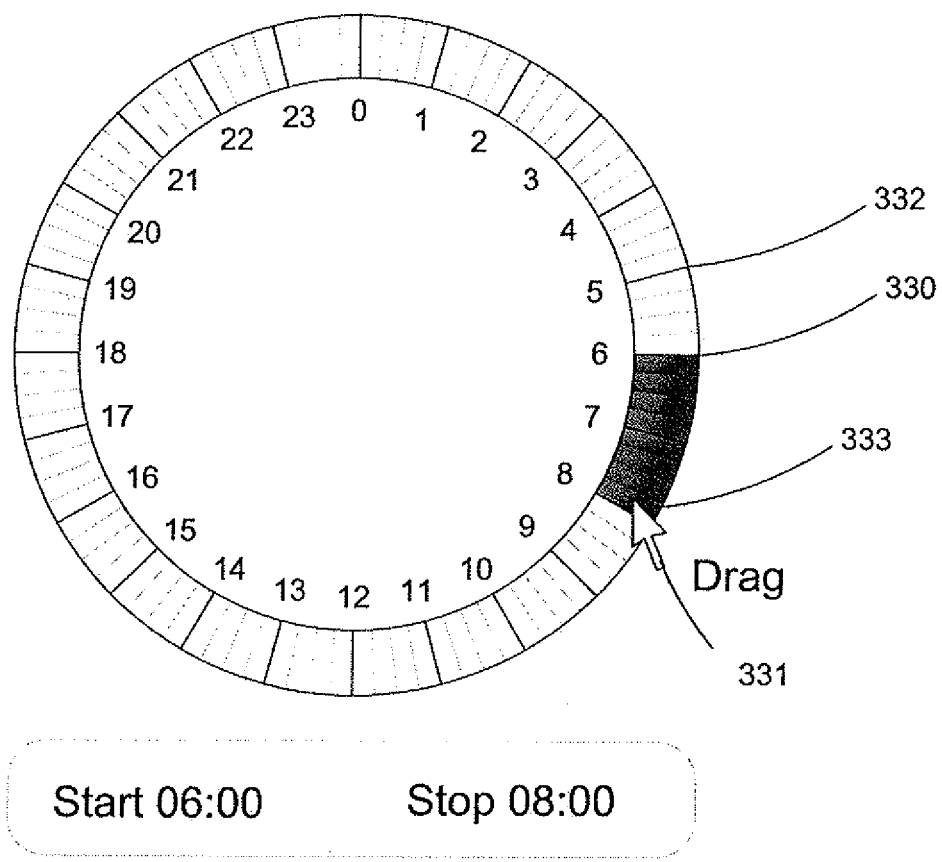

The filled segments can also be coloured coded with various colours to represent a user-selected temperature setting as shown in FIG. 6A FIGS. 3C to 3D show the GUI and a computer mouse type device that is being used to manipulate the cursor around the GUI. FIGS. 3C to 3D shows how you would set a schedule on a digitally displayed analogue dial type timer switch. The process starts with the computer mouse being manoeuvred to place the cursor 320 over a chosen segment. The segment directly under the cursor will be indicated by a light shading as shown in FIG. 313. To confirm this selection a left click is required on the computer mouse. This action changes the segment colour from light shading to a solid colour 321 thus confirming the chosen start time. Currently this on selection 321 has only fifteen minutes duration starting at 06.00 hours 322 and stopping 06.15 hours 323.

To increase the duration of this on selection the start segment 330 has to be selected with the cursor 331, by pressing the left click on the computer mouse when the cursors is in the appropriate position, while the left click button is held down the cursors is dragged around the circumference of the dial 332 until the appropriate time segment for the off action 333 is reached and then the button is released.

The new selection shown has 8 fifteen-minute segments, from 06.00 hours 330 to 08.00 hours 333 which leaves the total on time for this selection at two hours.

The time select region is thus interactively operable to enable a user to select one or more segments on the dial, in which the selected one or more segments correspond to a first time period (i.e. from 06.00 hours to 08.00 hours) for the schedule and any unselected segments (i.e. from 08.00hours to 06.00 hours) correspond to a further time period for the schedule.

Figure 3E:
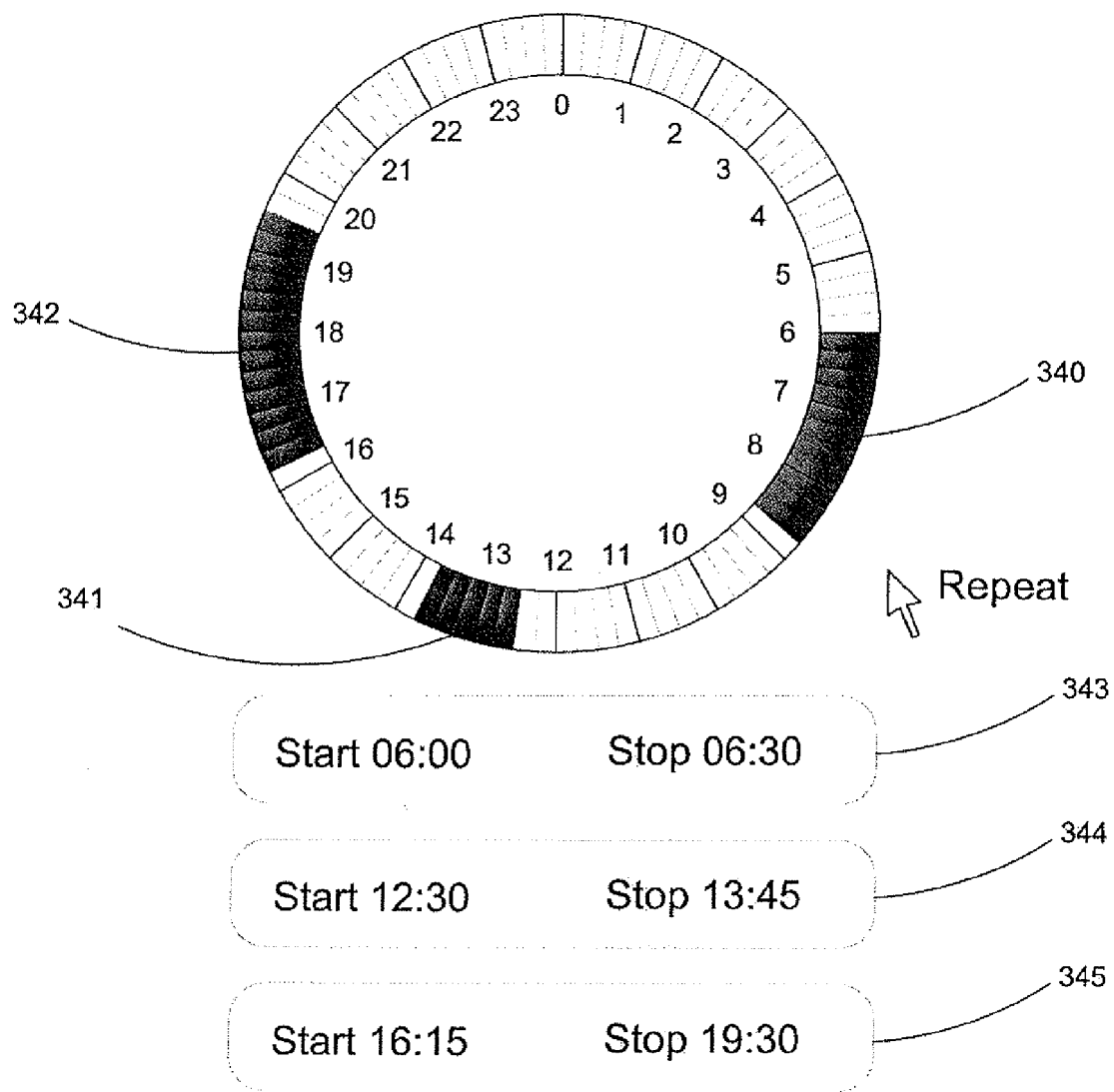

FIG. 3E show this selection process being repeated until the required on/off schedule on this dial are complete as shown in FIGS. 340,341 and 342. The on/off schedules are also shown numerically 343,344 and 345. The numerical values shown on 343,344 and 345 can also be edited by clicking on the appropriate number and overwriting it with a new schedule time.

Figure 3F:
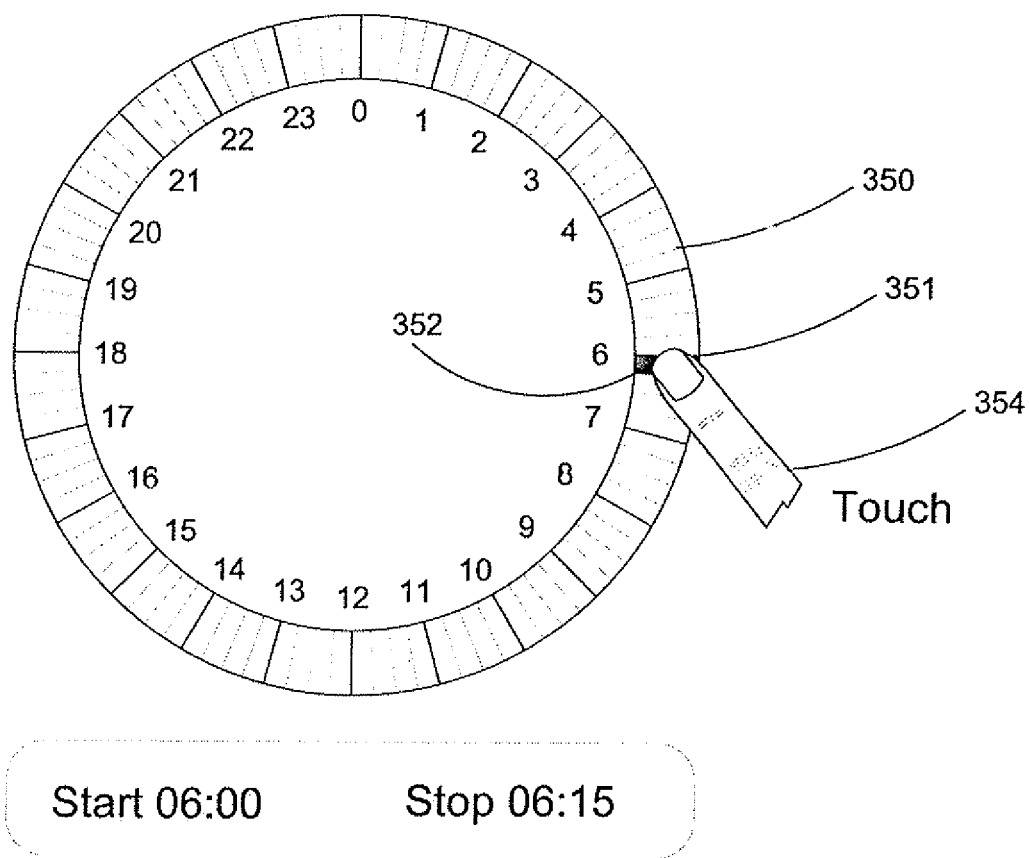
Figure 3G:
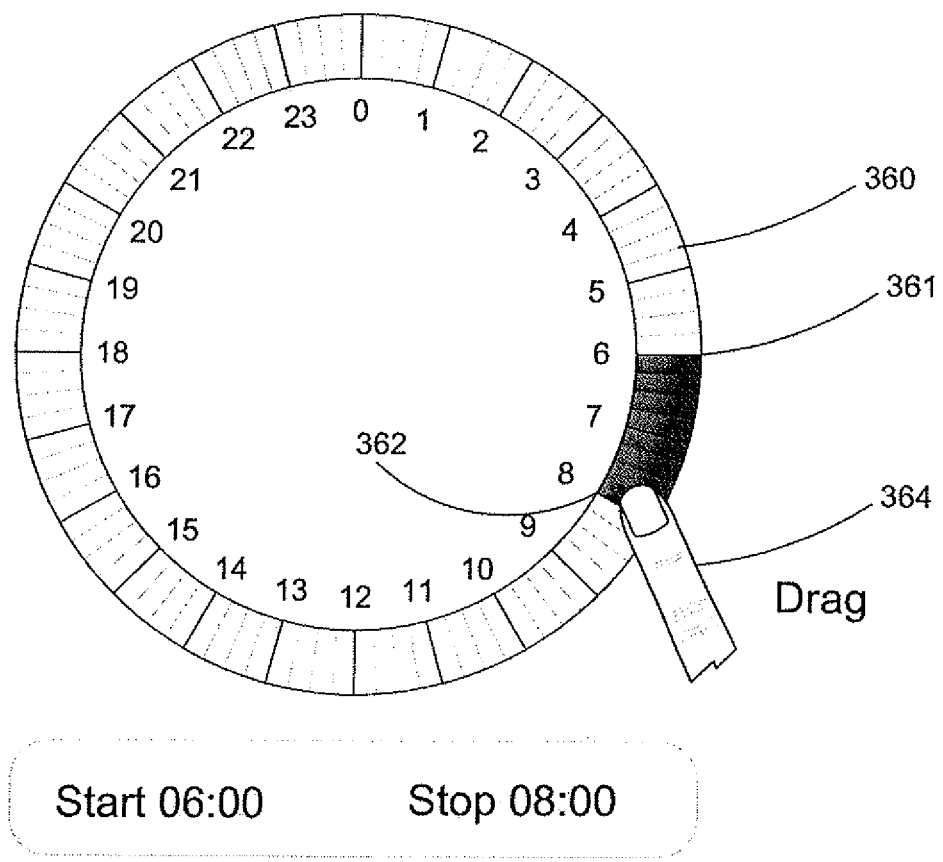

FIGS. 3F to 3G show a finger 354 being used (although a stylus type device could be used instead) to set a schedule on a touch screen version of the analogue dial type timer switch. The process starts with the finger being manoeuvred to touch a chosen start segment. This action changes the segment colour from the off state (no shading) to an on state (solid colour) 351 thus confirming the chosen start time. Currently this on selection 351 has only fifteen minutes duration starting at 06.00 hours 351 and stopping 06.15 hours 352.

To increase the duration of this on selection the finger touches the start segment then drags around the circumference of the dial 332 until the appropriate time segment for the off action 362 is reached and then the finger is released.

The selection shown has 8 fifteen-minute segments, from 06.00 hours 330 to 08.00 hours 361 which leaves the total on time for this selection at two hours.

Figure 3H:
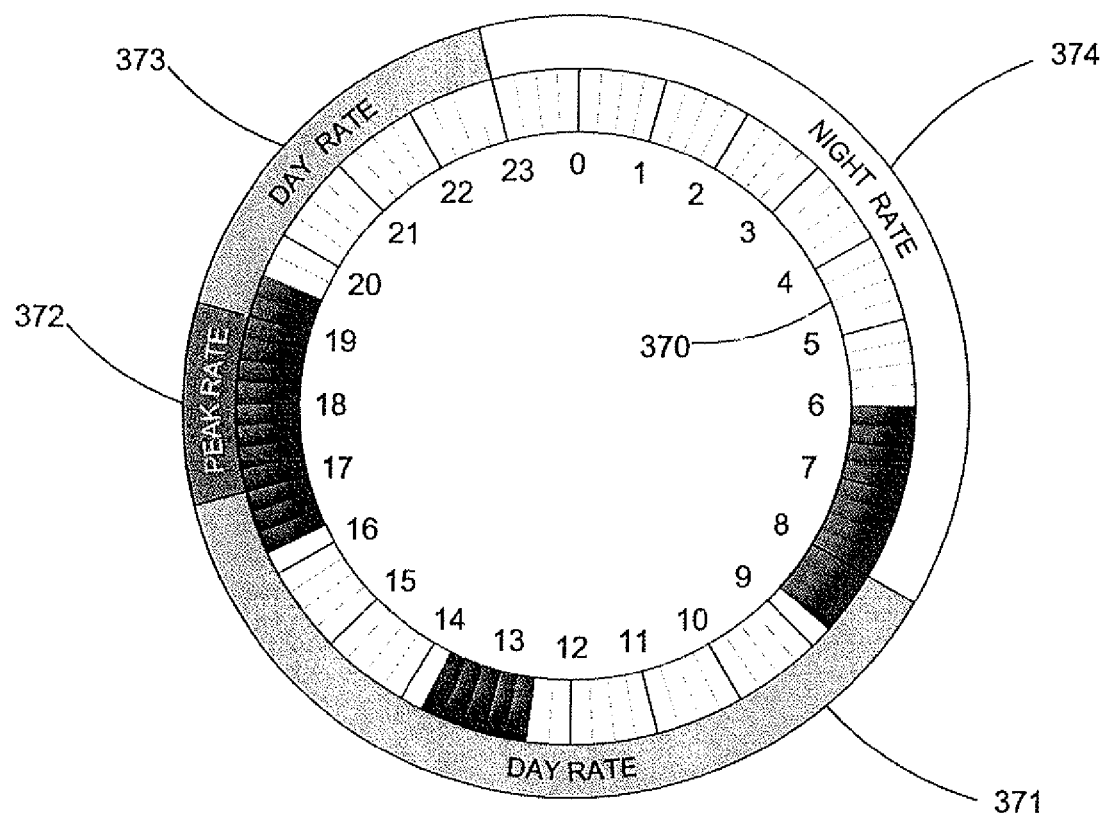

FIG. 3H shows a dial in which each segment 370 has a background colour or appearance which indicates a time of use price or rate 371, 372, 373, 374 for the operating parameter. Accordingly, consumers may select certain segments of the time select region to avoid on times which might fall within the peak or expensive rate times.

FIG. 4A shows an embodiment of the invention in which the schedule timer is shown as a touch screen. 400 show's the outline of the controller. Inside this controller is a touch screen 480. The touch screen 480 shows some of the key components required for this controller. It can show one or more digitally displayed analogue type timer switches 410. FIG. 4A shows an example of a three zone analogue dial type timer switches. FIG. 4A also shows tabs for each day of the week 440. This allows users to programme each of the 7 days with a different schedule. Therefore the example shown would have a total of 21 digitally displayed analogue dial type timer switches.

Also shown are additional buttons and indicator lights 450 and 460 for each zone. Alternatively or additionally the controller may contain more or less of these buttons 450 or indicator lights 460 per zone for functions like advance or hold.

FIG. 4B shows an embodiment of the invention in which the schedule timer is shown without a touch screen as it is envisaged that the device could be set remotely from a pc or from a mobile. The schedule timers enclosure would only require a basic select 492 and boost buttons 492 with indicators lights for on 493/off 494/auto 495 and boost 496 for each zone.

FIG. 5A shows a screen shot from a pc type user interface device 500. This user interface includes a number of digitally displayed analogue dial type timer switches 510 that were shown in FIG. 3A. It also includes the on/off schedules in a numerically format 520. The numerical type values shown 520 can also be edited by clicking on the appropriate number and overwriting with a new schedule time. It also has a designated set of digitally displayed analogue dial type timer switches 510 for each of the 7 days shown on the tab 530. The interface includes five additional buttons. 540 is a (previous day) button when pressed selects the previous days schedule. 550 is a (copy options) button when pressed gives the user four options 1) allows the user to copy the currently displayed schedule settings into the next day schedule. 2) Allows the user to copy the current day schedule into all the weekdays (Monday to Friday) 3) Allows you to copy the current day schedule into Saturday, Sunday. 4) Allows the user to copy the current schedule into all seven days. 560 is a clear options button which gives the user two options 1) Allows the user to clear today's settings. 2) Allows the user to clear the full weeks settings. 570 is a (next day) button that when pressed allows the user to view the next day schedule. 580 (apply settings now) updates the full schedule to the controller.

FIG. 5B shows an overview of the programme schedules for a typical three zones analogue dial type timer switches with a summary for each of the 7 days.

FIG. 6A shows a screen shot from a pc type user interface device 600. This user interface includes a number of digitally displayed analogue dial type programmer controller 610 for each zone. It also includes the on/off schedules and temperatures in a numerical format 620. The numerical type values shown 620 can also be edited by clicking on the appropriate number and overwriting with a new schedule time or temperature. It also has a set of digitally displayed analogue dial type programmer controller 610 for each of the 7 days shown on the tab 630. This embodiment of the GUI has a current temperature reading 631 for each of thee Zones. A zone name display area 632. A current target temperature setting 633 that is assigned to a time window 634 the colour coded dial version, 635 the start time, 636 the stop time of the numerical version of 634.

The interface includes five additional buttons. 640 is a (previous day) button when pressed selects the previous days schedule. 650 is a (copy options) button when pressed gives the user four options 1) allows the user to copy the currently displayed schedule settings into the next day schedule. 2) Allows the user to copy the current day schedule into all the weekdays (Monday to Friday) 3) Allows you to copy the current day schedule into Saturday, Sunday. 4) Allows the user to copy the current schedule into all seven days. 660 is a clear options button which gives the user two options 1) Allows the user to clear today's settings. 2) Allows the user to clear the full weeks settings. 670 is a (next day) button that when pressed allows the user to view the next day schedule. 680 (apply settings now) updates the full schedule to the controller.

FIG. 7 shows a screen shot from a mobile type 700 user interface device with a touch screen 710. This user interface shows a digitally displayed analogue dial type timer switches 720 the same type that were shown in FIG. 3A. It also includes the on/off schedules in a numerically format 730 start time, 740 stop time while the number 1 button 750 shows the selection displayed is the first on/off schedule of the day. Individual schedules can be set for each day by selecting the required day from the tab 770. While additional zones can be set by selecting the appropriate zone tab 760 when the schedule is complete it can be applied by the selecting the apply button 780.

FIG. 8 shows a representation 50 of a user's mobile telephone and a further representation 60 of the user's mobile telephone showing the message received from the GSM module of the control unit. Samples of messages transmitted and received are detailed in the remainder of the Figure. At 51 if the user wishes to turn on the heat in Zone 1, then the message simply reads "Zone 1 on" and the received message at 62 reads "Zone 1 on, Zone 2 off, Zone 3 off". The user will receive this confirmation text when instructions are carried out assuming that the GSM module is provided with credit to cover the cost of the message. The message 52 "Zone 2 on 5" means that the user wishes to turn on the heat in Zone 2 for 5 hours and the message 62 received back reads "Zone 1+ on, Zone 2, Zone 3 off". When the user wishes to turn Zone 1 off, he sends a message as at 53 reading "Zone 1 off" and receives a reply reading "Zone 1 off, Zone 2 on, Zone 3 off". When all three zones are to be turned on, the user sends the message at 54 reading "all on" and reply back reads "Zone 1 on, Zone 2 on, Zone 3 on". If the user wishes to turn on all three zones for 2 hours, he sends a text as at 55 reading "all on 2" and reply at 65 is "Zone 1+ on, Zone 2+ on, Zone 3+ on". To turn all three zones off the text sent at 56 is "all of" and the reply received by the user at 66 is "Zone 1 off, Zone 2 off, Zone 3 off".

For example, fifteen minute segments of a twenty hour dial may be broken down with each segment being assigned one particular character which can be included in a SMS text message to represent one of ninety six different fifteen minute segments in a twenty four hour clock.

FIG. 10 is a schematic representation of a how the instructions for one day are arranged in the three zones, indicated by the reference numerals for a text message. The problem which this aspect of the invention had to overcome is how it would be possible to set a schedule with a single text message.

It is convenient to analyse this problem by breaking down how much data is required as follows:

1) Number of cycles required for a 3 zone 7 day heating clock A one zone digital timer requires 3 on and 3 off times per day (3+3=6) separate timings.

A one zone 7 day digital timer requires 6 timings for each of the 7 days (6×7=42) separate timings.

A three zone 7 day digital timer requires 42 timings for each of the 3 zones (42×3=126) separate timings so if 126 separate timings is divided into full on/off cycles (126+2=63). Accordingly, it will be necessary to send 63 on/off cycles to set the clock of a heating control apparatus.

2) The amount of data or spaces required for a full on/off cycle The information required for each cycle is as follows.
(a) The name of the zone (from Zone 1 to Zone 3)
(b) The name of the day (from Monday to Sunday)
(c) The start time in hours and minutes (04:30)
(d) The stop time in hours and minutes (18:00)
Example: (Zone 1 Monday on 04:30 off 18:00)

This information can take up to 31 spaces in a text message.

3) The amount of data or characters available in a text message for a full on/off cycle If the number of spaces available in a text message is 160 and there are potentially 63 cycles to set, (160+63=2.54), then this allows the use of a maximum of 2 spaces for each on/off cycle.

Consequently, if a complete on/off cycle uses up to 31 spaces and there are only 2 spaces available in the message, then a method of compression is required to fit the potential 31 spaces down to just 2 spaces.

The invention therefore provides a method to compress 31 spaces e.g. (Zone 1 Monday on 04:30 off 18:00) down to 2 spaces. How the invention achieves this solution may be broken down into a series of steps as follows:

1) Remove empty spaces. (Zone 1 Monday on 04:30 off 18:00) to (Zone1Mondayon04:30off18:00). This reduces the on/off cycle from 31 to 26 spaces.

2) Remove unnecessary punctuation (::). (Zone1Mondayon04:30off18:00) to (Zone1Mondayon0430off1800). This reduces the on/off cycle from 26 to 24 spaces.

3) Remove the on/off commands by always having the on time followed by the off time. (Zone1Mondayon04:30off18:00) to (Zone1Monday04:3018:00). This reduces the on/off cycle from 24 to 19 spaces.

4) Compress timings from 4 spaces each in to 1 space each. Divide 24 hours into 96 equal parts. Each part represents 15 minutes (00:00/00:15/00:30/00:45) etc. Give each part a unique character or symbol i.e. (04:30=S). (Zone1Monday04301800) to (Zone1MondaySc). This reduces the on/off cycle from 19 to 13 spaces.

5) To remove the day names each location in the texts 160 spaces is assigned a specific function. Each day gets allocated 18 spaces where its on/off timings are inserted (126+7=18) (Zone1MondaySc) to (Zone1Sc). This reduces the on/off cycle from 13 to 7 spaces.

Thus in FIG. 10 a user has inserted the character "S" in a location 81 of the text message 80 corresponding to Monday and to switch Zone 1 "on". "S" corresponds with the time 4:30 am.

The user has also inserted the character "c" in a location 82 of the text message corresponding to Monday and to switch Zone 1 "off". The formulation of the text message thus involves a user inserting the corresponding characters into a designated location of the text message and repeating this procedure for all seven days of the week. The present invention thus reduces an encoding for a three zone timer for seven days of the order of 160 characters, which will include various command and confirmation characters in addition to the specific day and zone characters.

Turning now to FIG. 9 there is shown a user interface system implementing means 291 for sensing energy flowing through the programmable device 292 in accordance with the present invention.

In such an embodiment a sensing means for monitoring the current being drawn through the schedule controller 290 to the scheduled devices 292 is provided to establish if the scheduled devices 292 are active or inactive such as, for example a heating device that burns fuel is active and draws a higher current until it reaches a predetermined temperature at which point a thermostat renders it inactive for a period of time where it draws a lower or no current until it cools down to a minimum predetermined temperature whereupon a thermostat allows it to active again and the cycle restarts. The present invention thus allows the processor means of the user interface system 200 to count for example the amount of time that a scheduled device 292 was active over a given time period also the number of cycles that occur over a given time period. This information can then be displayed on any of the user interface display units available to the processor means.

The user interface system 200 further displays graphically or numerically on user interface display units the amount of a substance used for a given time period by multiplying the amount of time that the scheduled device 292 was sensed to be active by the scheduled devices 292 active usage rate for that substance. In this way the processor means of the user interface system 200 can calculate a substance usage rate for a device 292 connected to it for example by sensing how long a active oil burner takes to empty a known quantity of oil then the processor will divide the number of liters by the number of hours and display the liters/hour rate for the active burner. This information can then be displayed on any of the user interface display units available to the processor means.

The processor means of the user interface system 200 can calculate a substance usage rate for a device 292 connected to it for example by starting with a full or referenced oil tank level then sensing the amount of active burn time between refills, then measuring the amount of oil it takes to replenish the tank to the full or referenced level. The processor will divide the number of liters by the number of hours and display the liters/hour rate for the active burner. This information can then be displayed on any of the user interface display units available to the processor means. The processor means can calculate the energy usage rates of an electrical device connected to it for example by sensing the actual current drawn through the schedule controller's current sensor. This information can then be displayed on any of the user interface display units available to the processor means.

Figure 11:
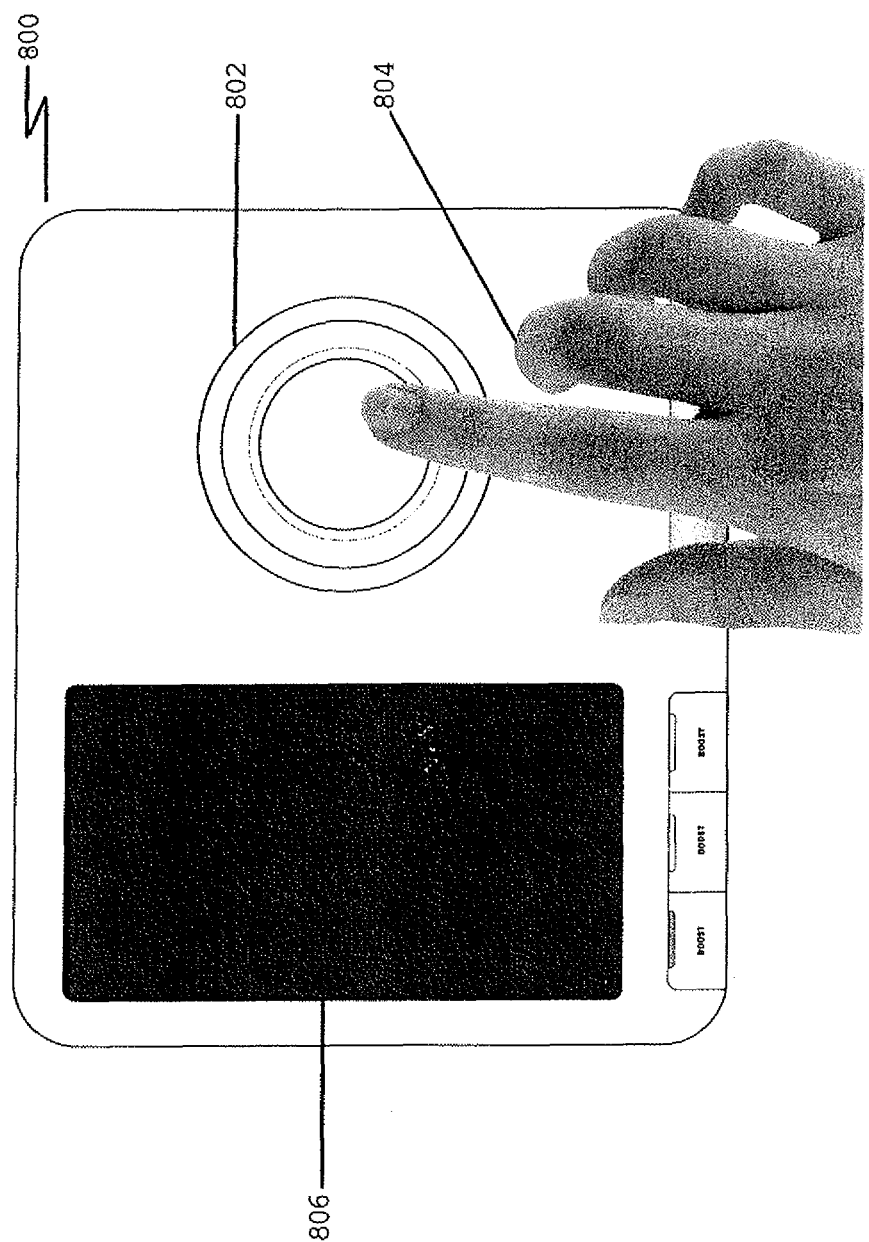
Figure 29:
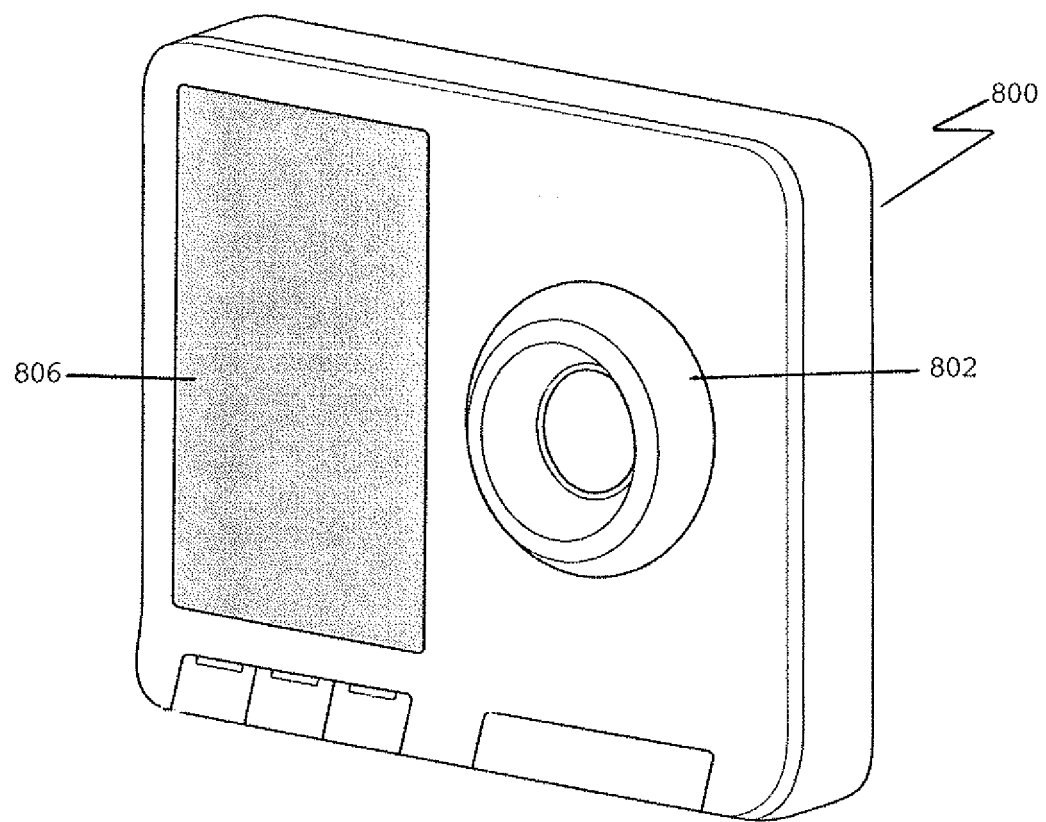

FIG. 11 shows a control panel device, indicated generally by the reference numeral 800, implementing the user interface system of the present invention. FIG. 29 is a perspective view of the control panel device. In the instance shown, the device 800 comprises a rotatable knob or dial 802 which can be turned and/or pushed by a user 804 to effect functionality of the device 800 in order to create and edit schedules and implement special functionality for the user interface system for a programmable device, which in the instance shown is a comfort controller, although this should in no way be seen as limiting as it could equally be used to implement a user interface system for other programmable devices as described above.

Figure 12:
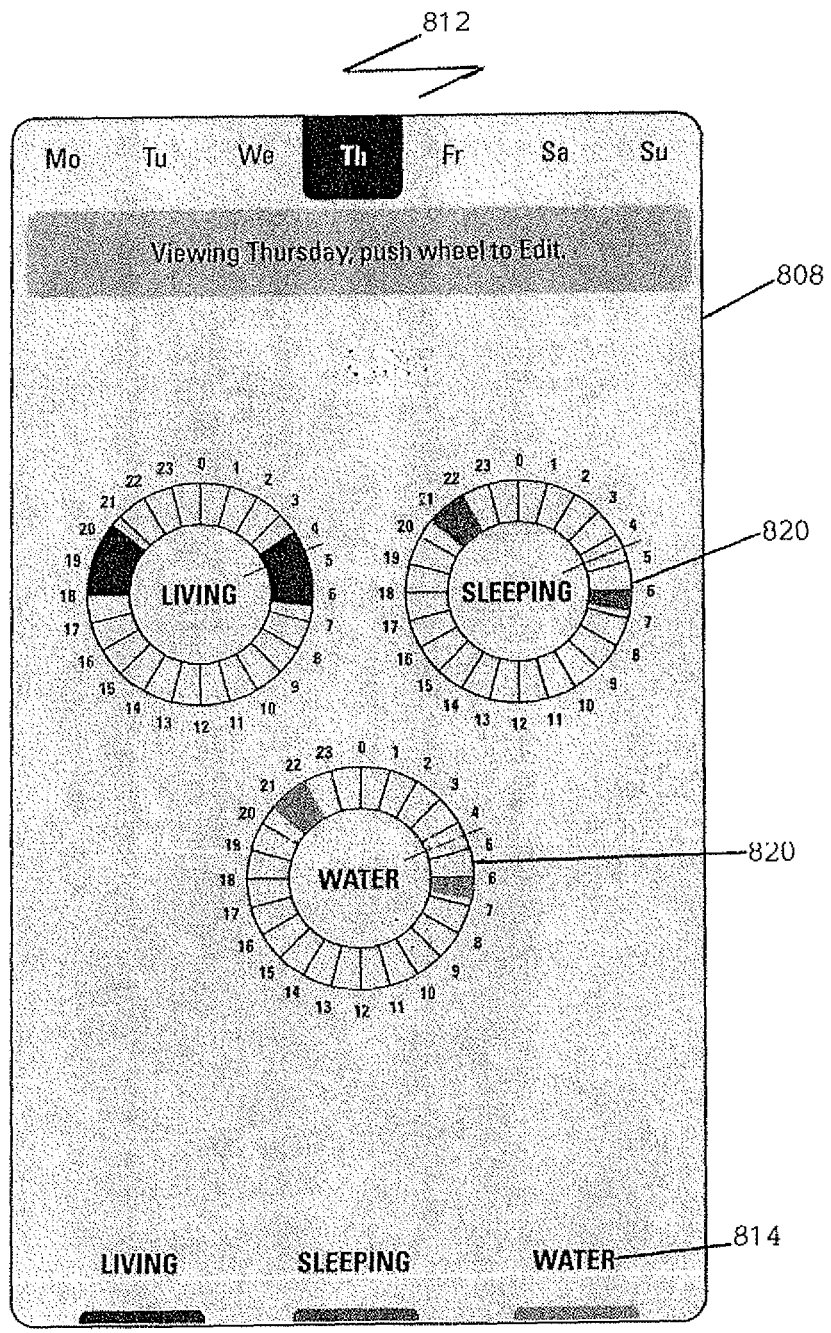

FIG. 12 shows an 'Overview' screen 808 which displays on the display 806 and is the 'home screen' of the device. When the device 800 is woken up from a standby/sleep state the overview screen 808 will be displayed. The Overview screen gives all of the necessary information with regard to the programmable device, which in the instance shown is a home's heating status in one screen. When accepting changes following edits or making changes to features such as Boost or Holiday mode, the device will revert to this screen when complete.

Also shown, is a calendar tab bar 812 which shows the days of the week. The calendar tab bar is visible in all default screens and the current day, which in the instance shown is Thursday, is highlighted. The content area of the screen 808 comprises overview clocks, one clock for each zone with a needle 820 showing the current time. Zone tabs 814 are also displayed. In the instance shown the zones are 'living', 'sleeping' and 'water'. The 'living' and 'sleeping' zones will be understood to correspond with rooms in a building which are designated as being 'living' or 'sleeping' areas, and the 'water' relates to heating of a buildings water supply.

Figure 30:
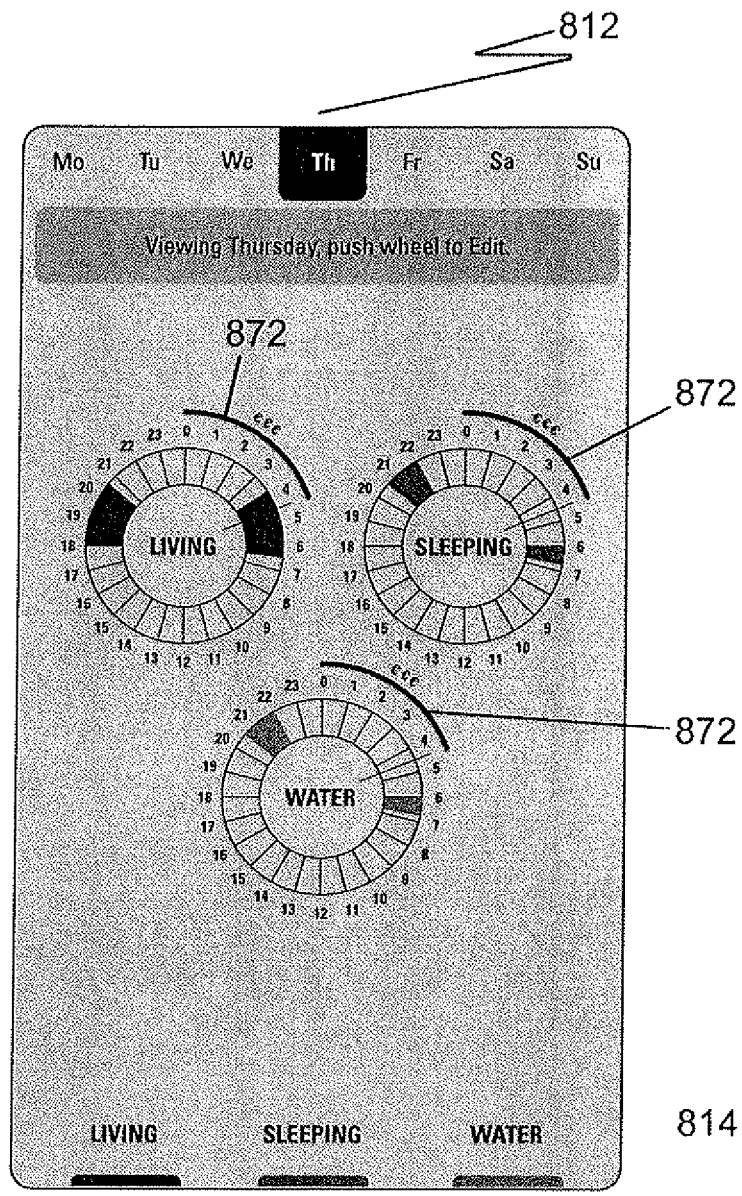
Figure 31:
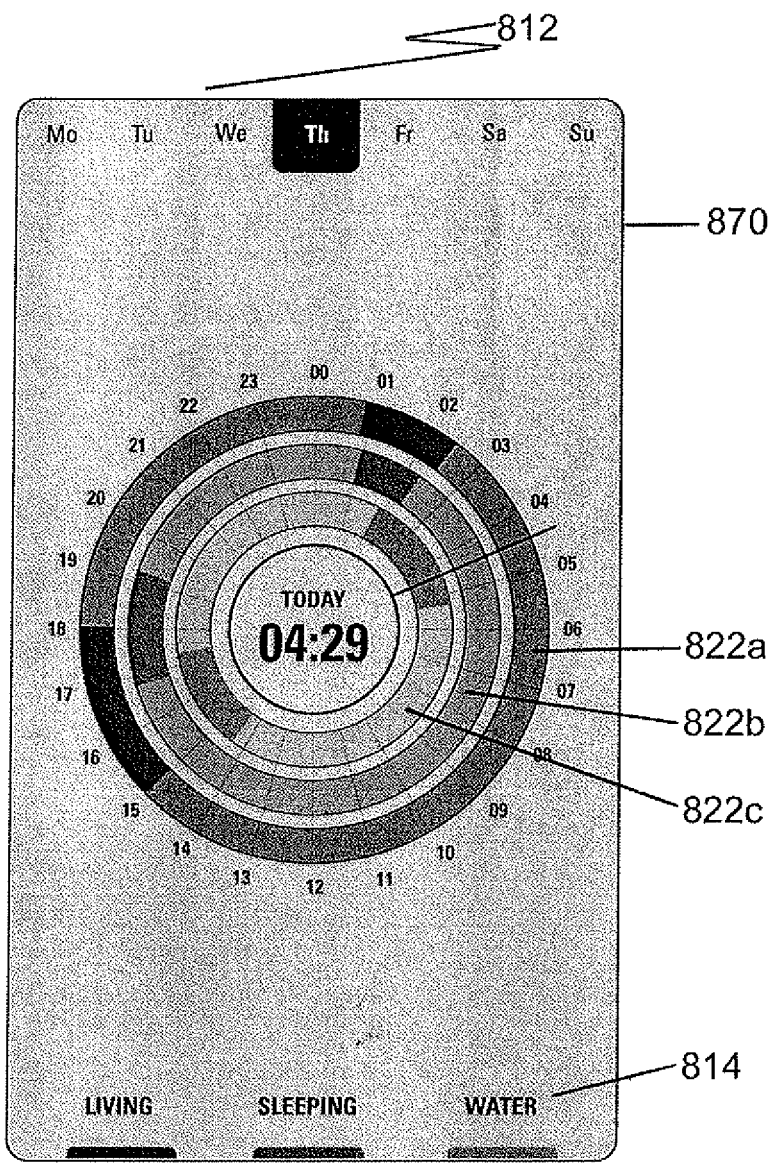
Figure 32:
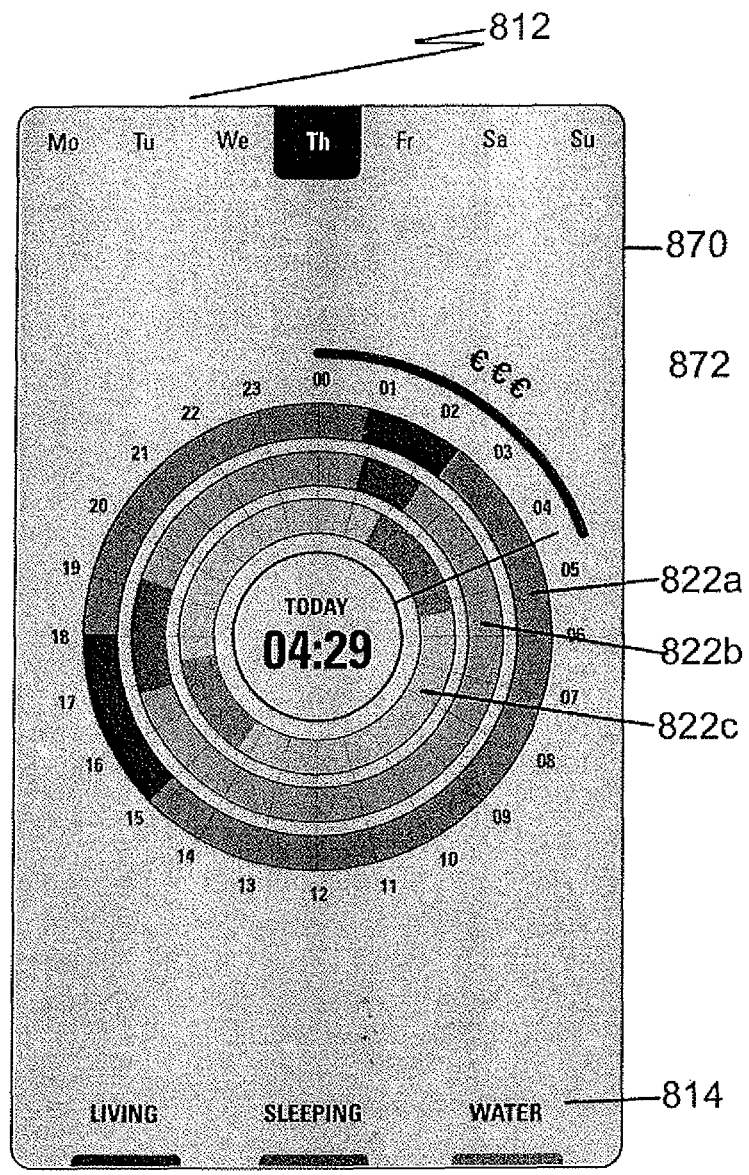

In FIG. 30 there is shown an alternative 'Overview' screen in which the display of a Euro symbol marker 872 indicates an off peak time period for which cost savings will be made should a user select segments within the time period. FIG. 31 shows an alternative 'Overview' screen 870 in which edit clocks or dials are provided as concentric dials 822a, 822b, 822c, in which each dial represents a different zone for which a schedule has been programmed. Each zone may be colour coded on the dial 822a, 822b, 822c for ease of identification by a user. FIG. 32 is the same as FIG. 31 but also includes a Euro symbol marker 872 to indicate an off peak time period for cost savings to a consumer.

Figure 13:
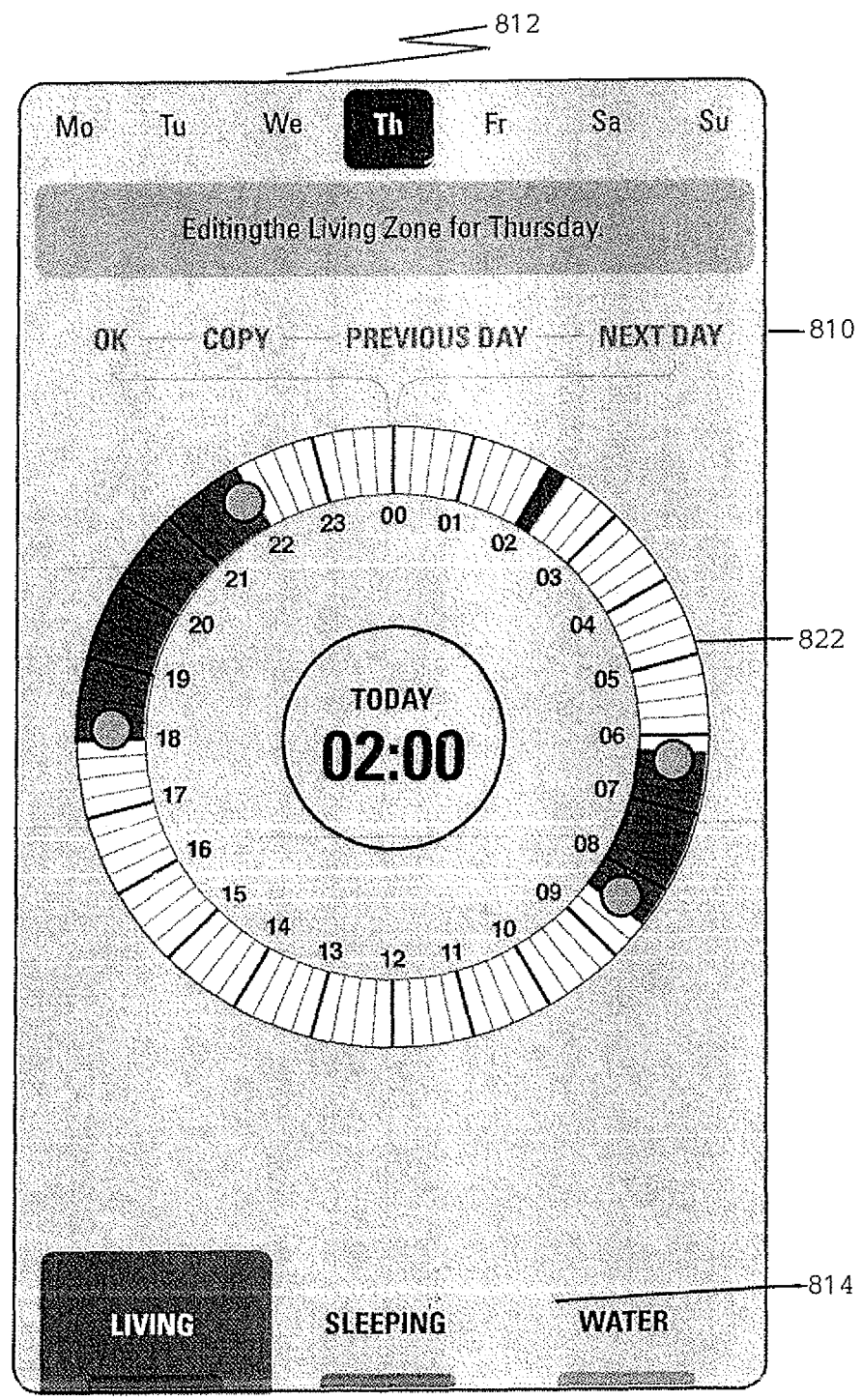

FIG. 13 shows the 'Edit' screen 810, which is the default screen for editing schedules. The screen 810 shows the day select region 812 and zone select region 814 being edited. An edit clock 822 is shown in which one 24 hour dial is divided into a plurality of adjacent 15 minute segments. The active section of the schedule is shown and colour coded in relation to zone tabs 814 at the bottom of the screen 810.

Figure 14:
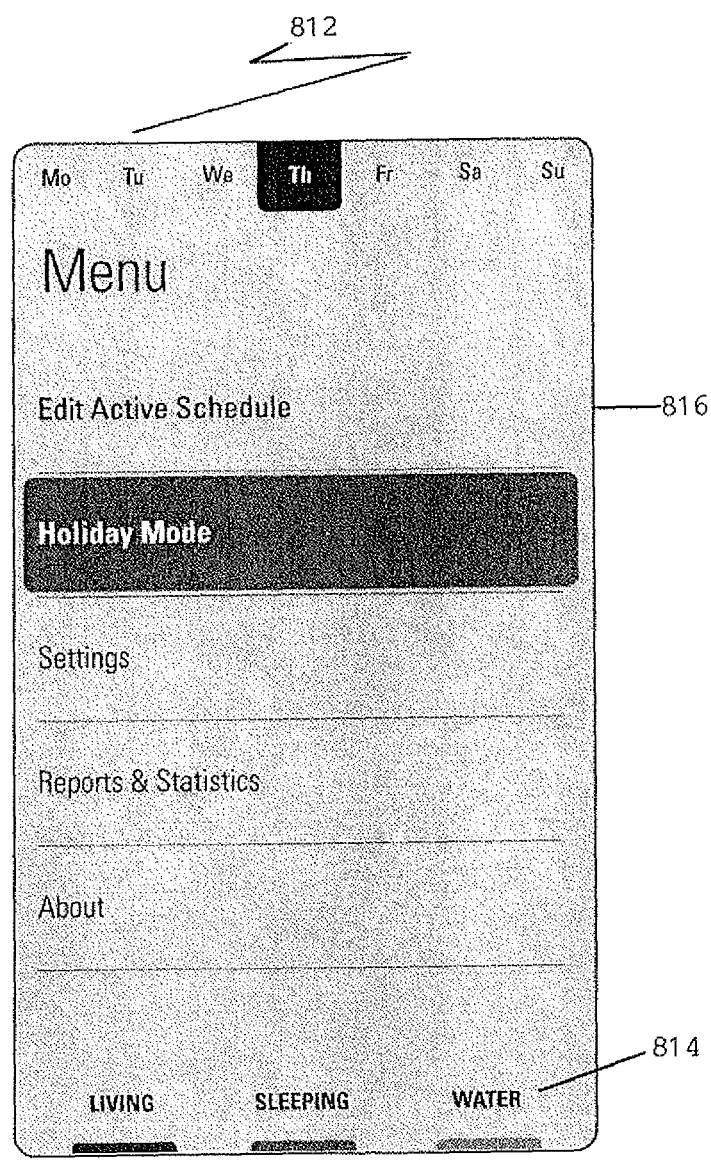
Figure 15:
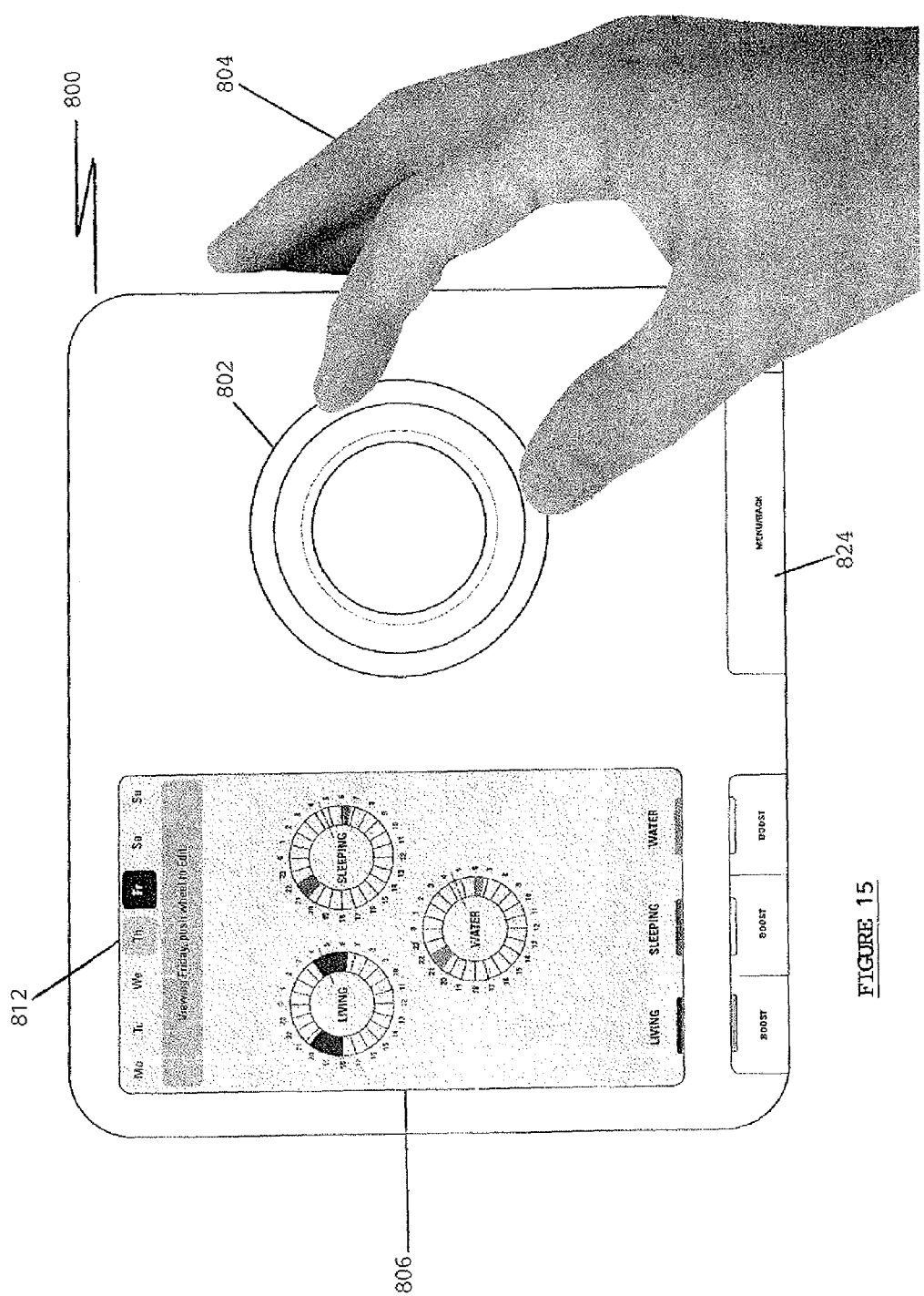

FIG. 14 is a 'Menu' screen 816 which is displayed when the user pushes the 'Menu' button 824, which is obscured by the hand 804 in FIG. 11, but clearly shown in FIG. 15. Shown on the 'Menu' screen 816 are menu titles which displays the name of the menu currently displayed.

By default, when the device 800 is woken from sleep or enters the 'Overview' screen 808, the focus for the scroll wheel 802 is on the calendar bar 812. Therefore, scrolling the wheel 802 jogs through days of the week. In the example, the user 804 has begun to twist the wheel clockwise, and the screen has moved on to show the schedule settings for Friday. The current day, being Thursday, is still faintly highlighted. Moving the dial through the days of the week will display schedule settings accordingly.

Figure 16:
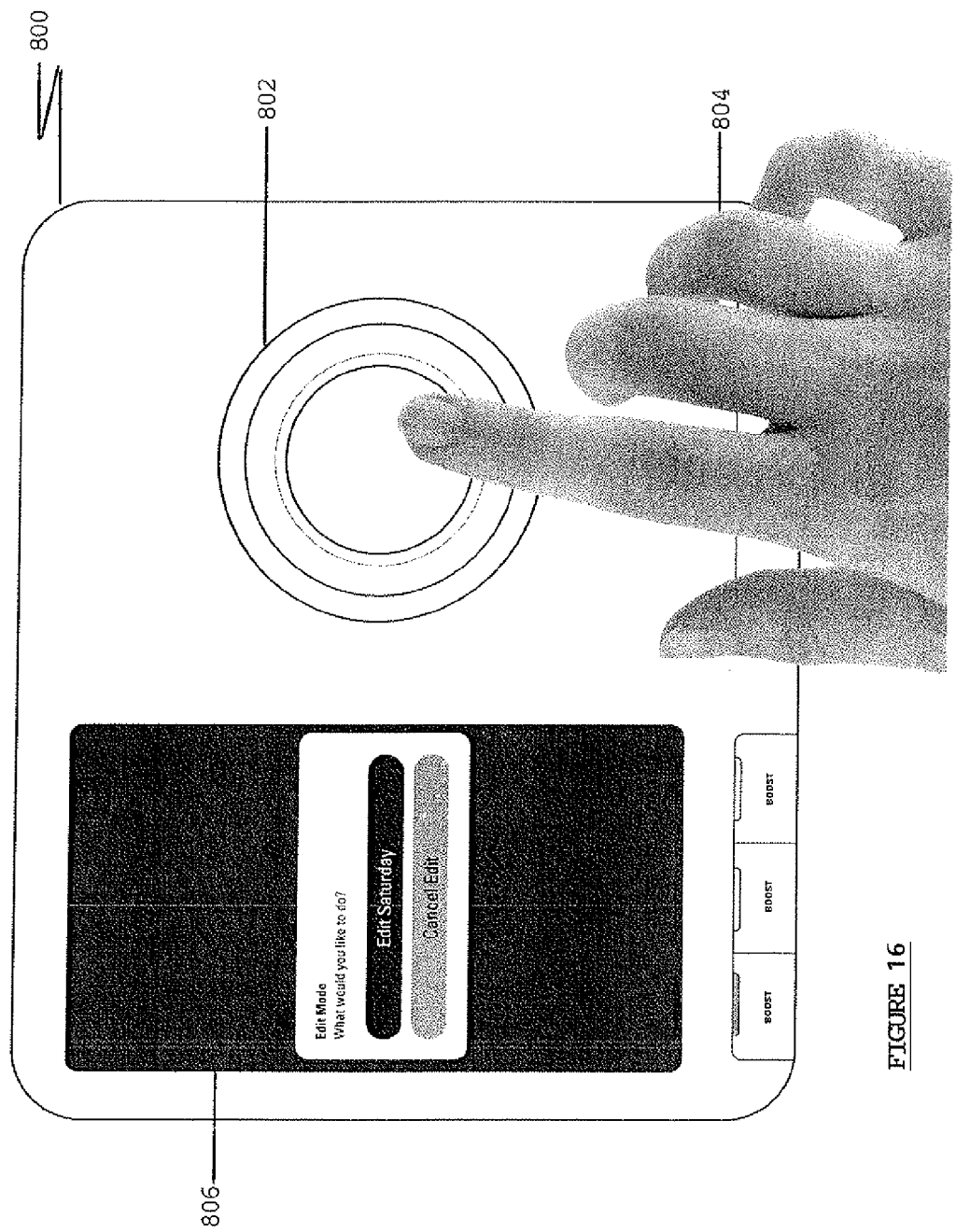

As shown in FIG. 16, when cycling through the days in the calendar bar 812, pushing the wheel 802 will enter edit mode for the selected day. Once the wheel is pushed the user must make a positive selection that they wish to enter edit made.

Figure 17:
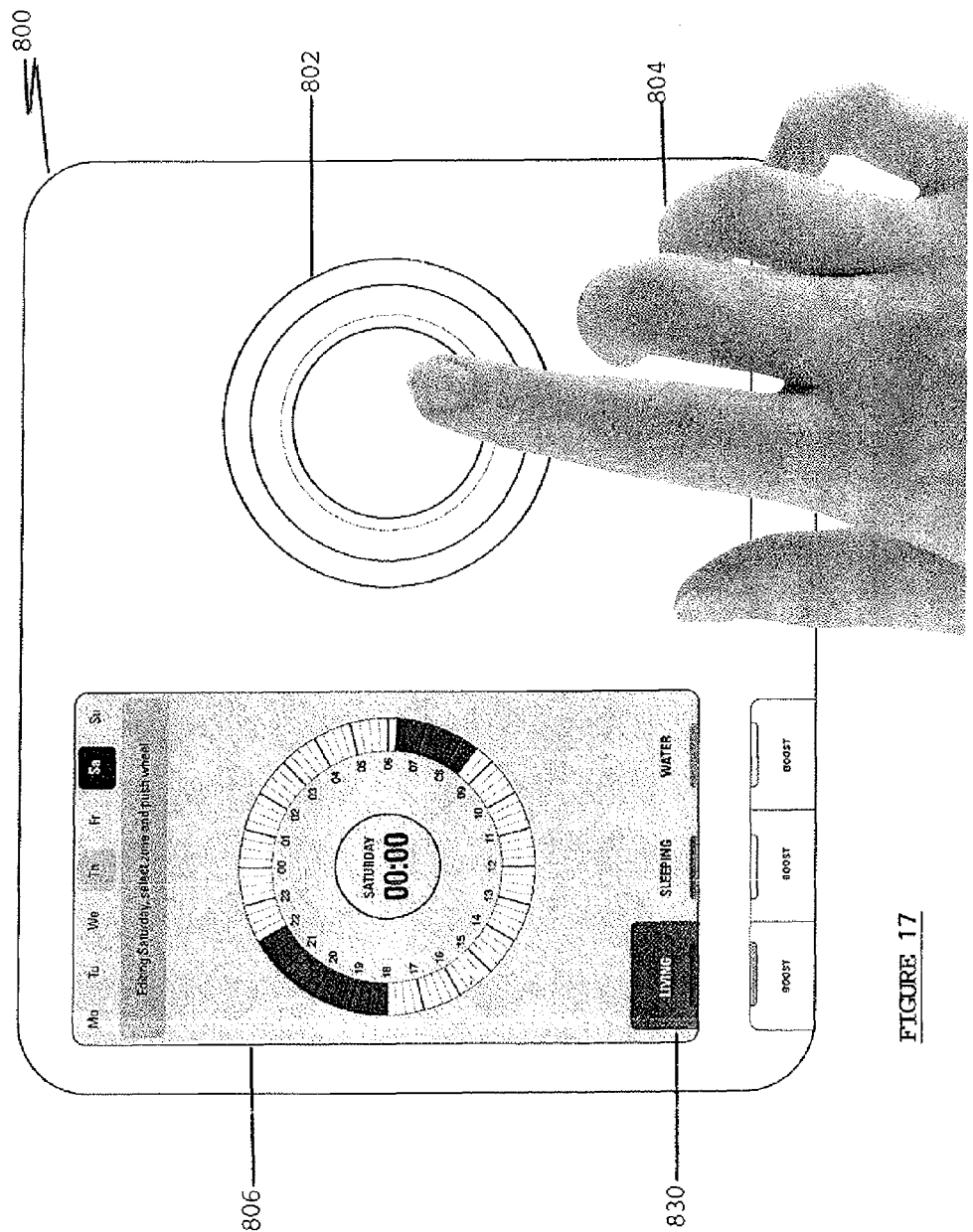
Figure 18:
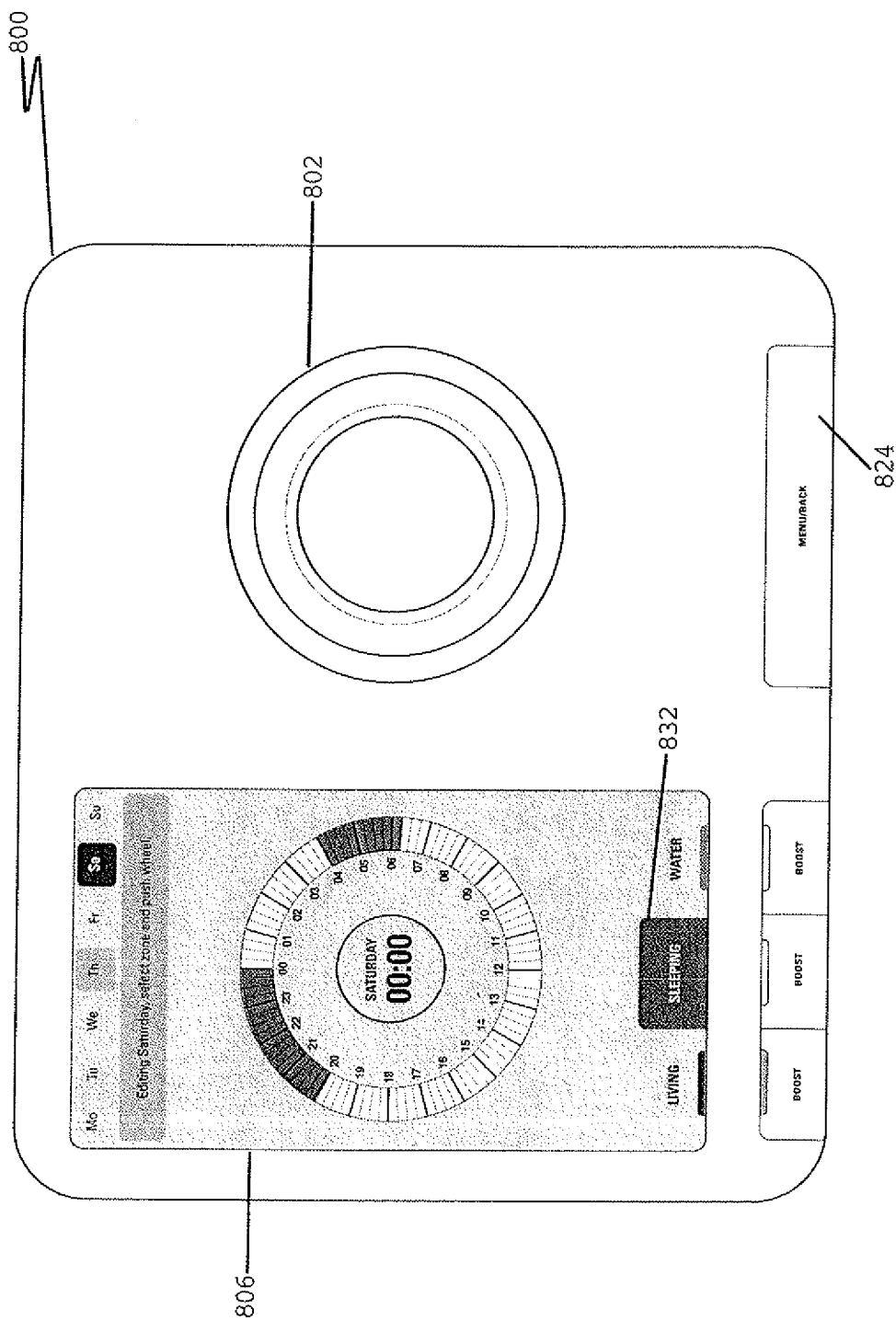
Figure 19:
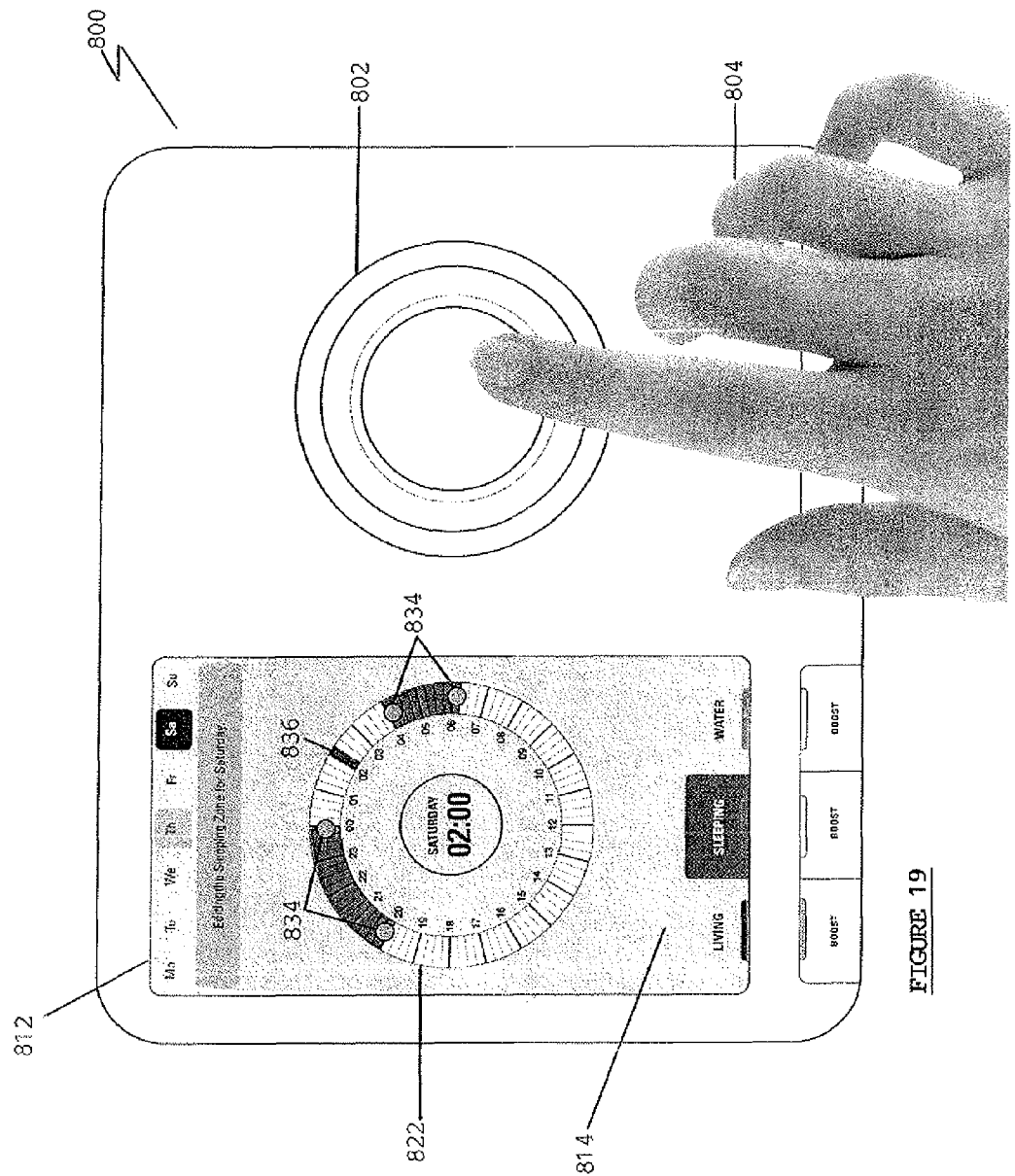

As shown in FIG. 17, once edit mode is entered the screen changes to the edit screen and focus shifts to the zone bar 814 and turning the wheel cycles through the three zones displayed. Presently the focus is on the 'Living' zone 830, but as shown in FIG. 18, the user has operated the wheel and moved the focus to the 'Sleeping' zone 832. To then edit the 'Sleeping' zone 832 the user pushes the wheel 802 upon which grab handles 834 and the cursor 836 appear on the dial 822 so that full editing may commence, as shown in FIG. 19.

Figure 20:
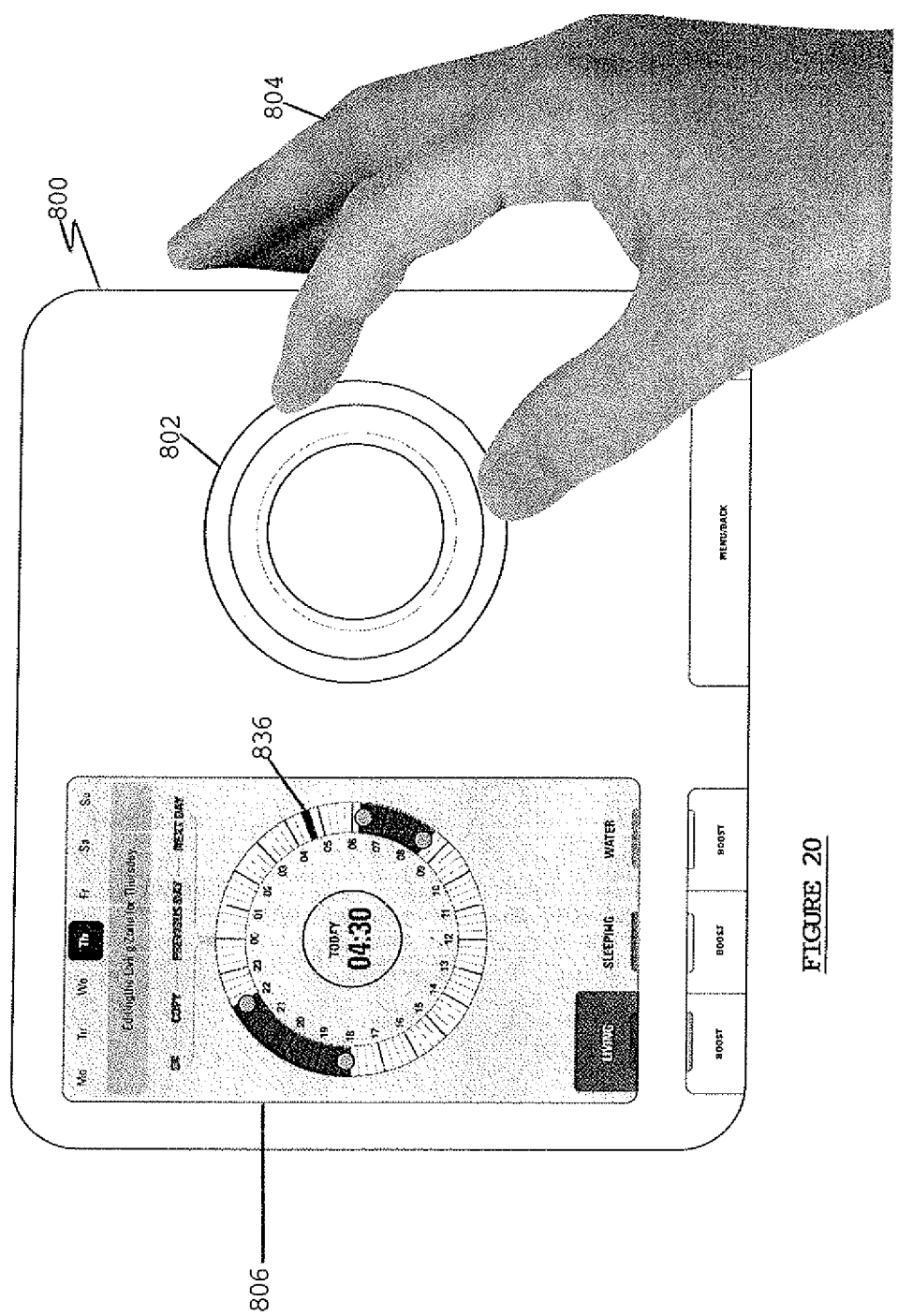
Figure 21:
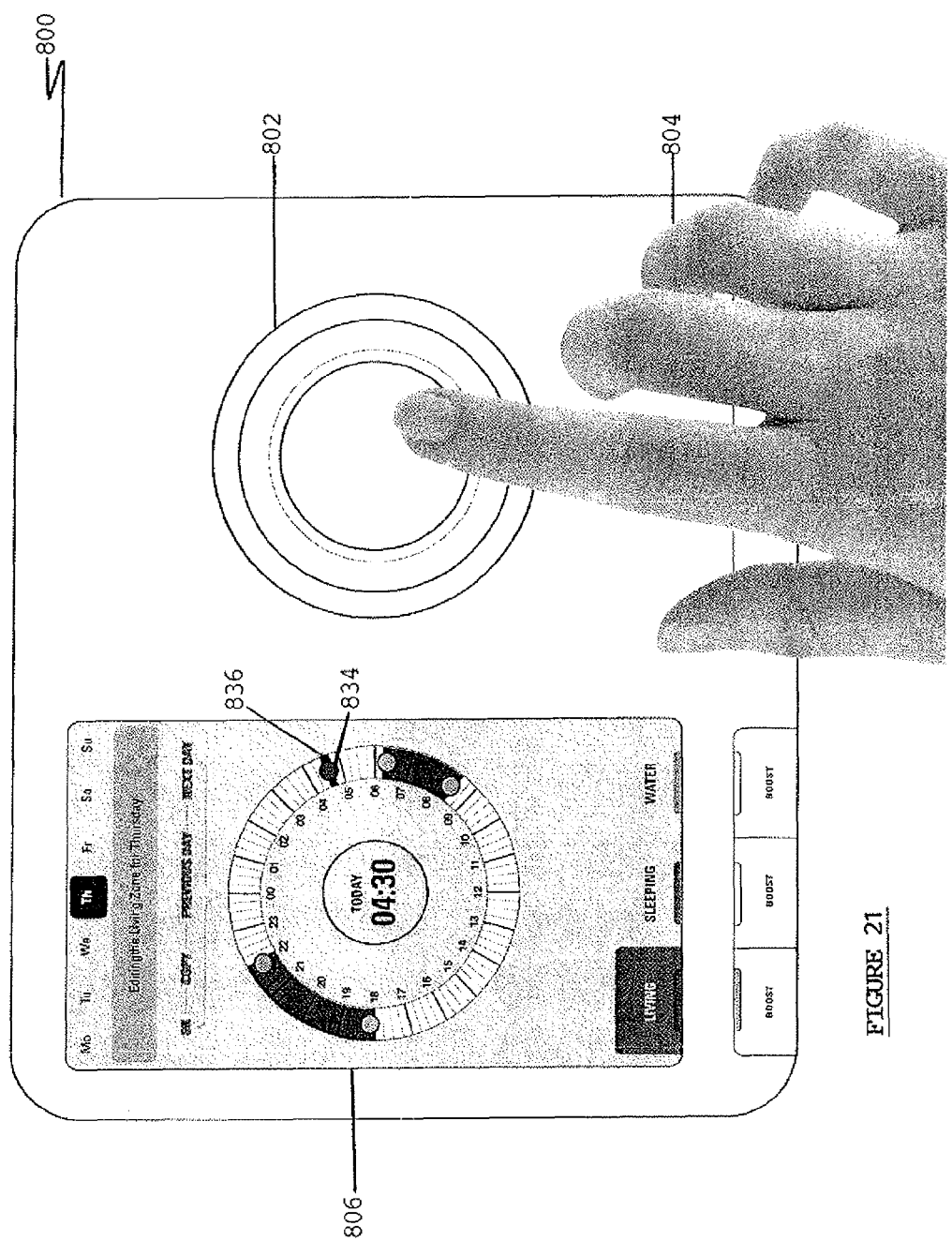
Figure 22:
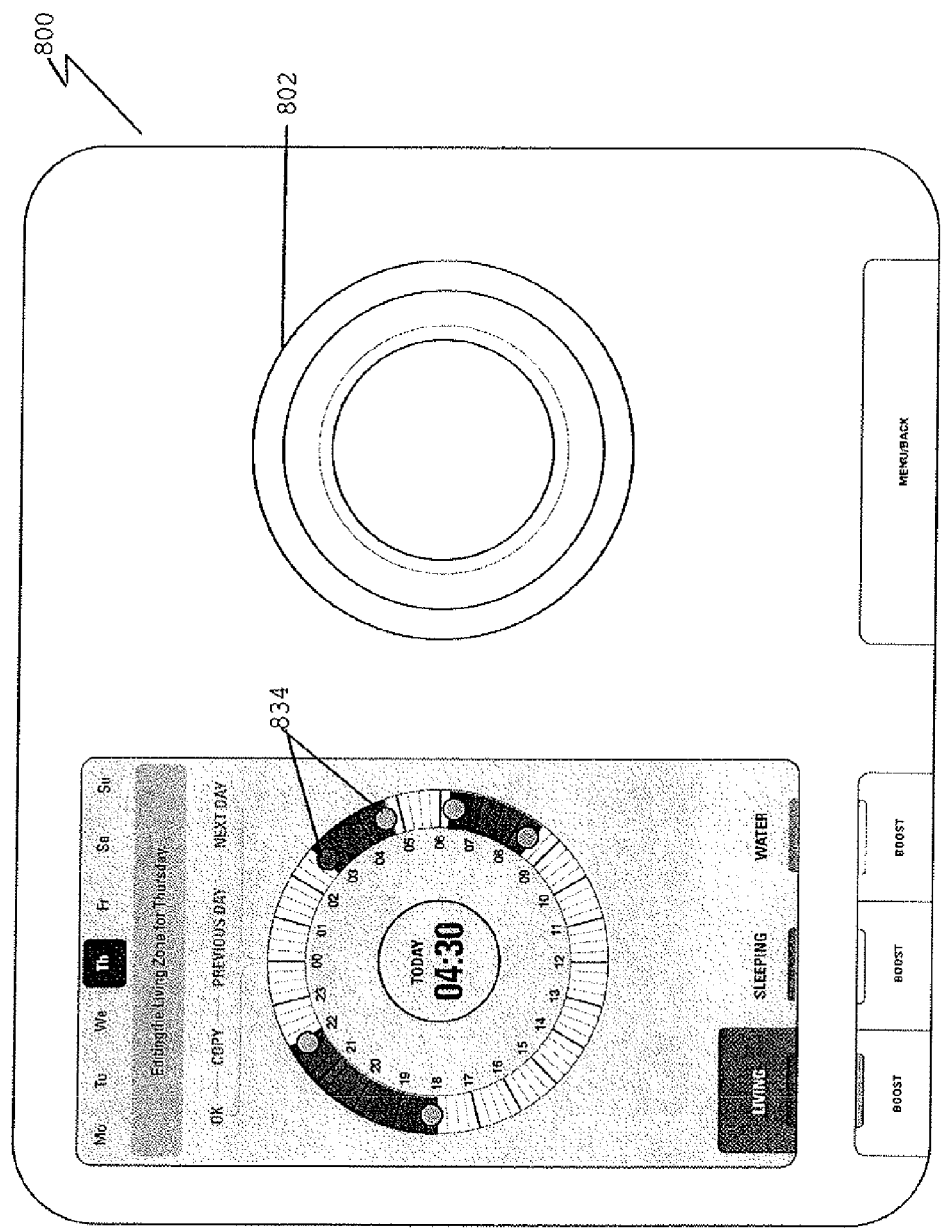

In FIG. 20, a user 804 wishes to add a section for a schedule which either starts or finishes at 04:30. By turning the wheel 802 clockwise the cursor 836 is moved to the corresponding segment and the readout communicates that 04:30 is the active segment of the clock 822. Pushing and holding the wheel 802 at this empty segment adds a new section for a schedule. The standard cursor 836 is replaced by an active segment plus a grab handle which moves with the wheel 802. In order to extend this section forwards or backwards from 04:30 the user must hold down the wheel and scroll in either direction.

Figure 23:
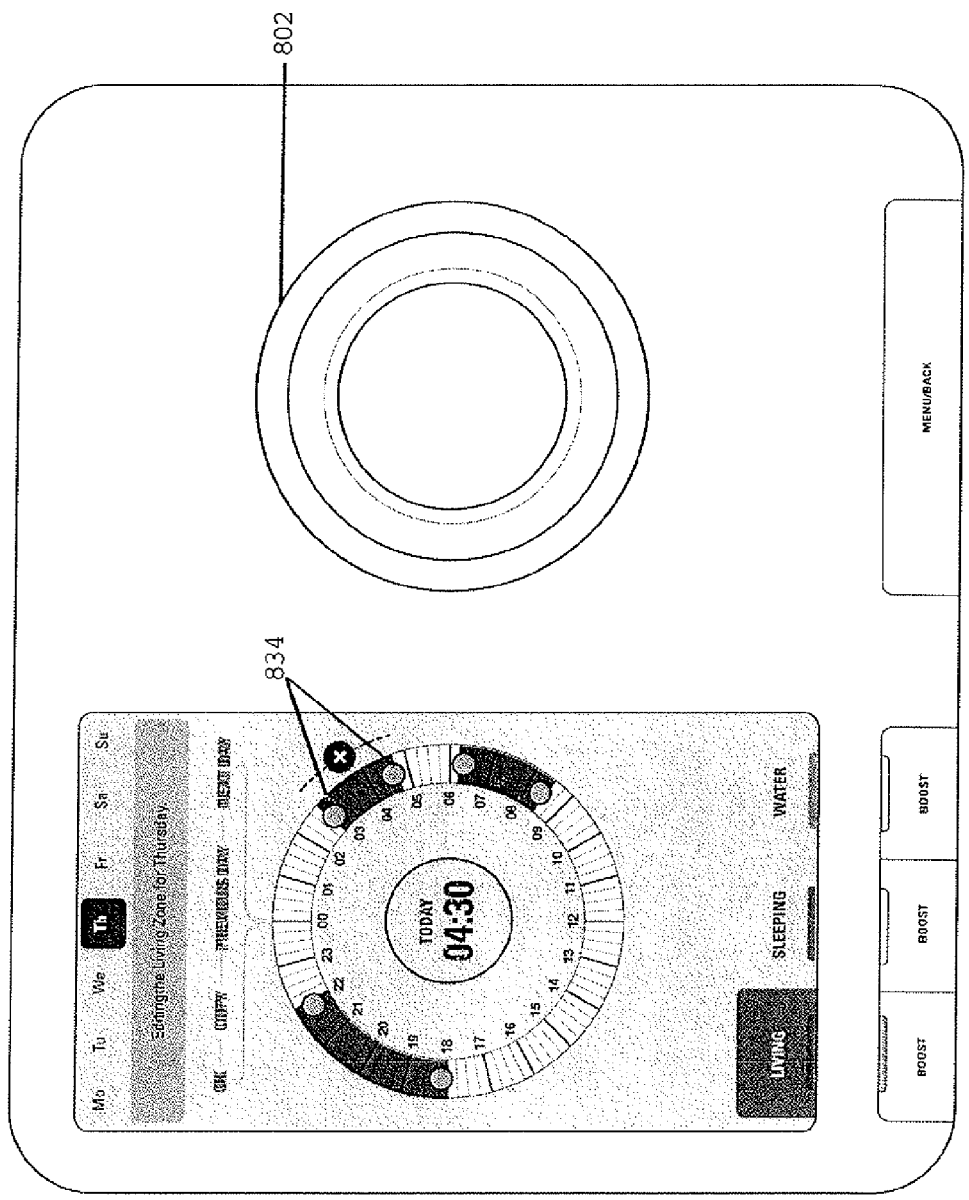

Scrolling anti-clockwise while holding the wheel 802 depressed moves the grab handle in the anti-clockwise direction, extending the new section from its original creation point. In the instance shown in FIG. 22, the time period has been created to run from 02:45 until 04:45. As shown in FIG. 23, releasing the scroll wheel 802 assigns the grab handle to 02:45 and creates a active time period for the schedule. This functionality is almost identical to that of the web portal.

Figure 24:
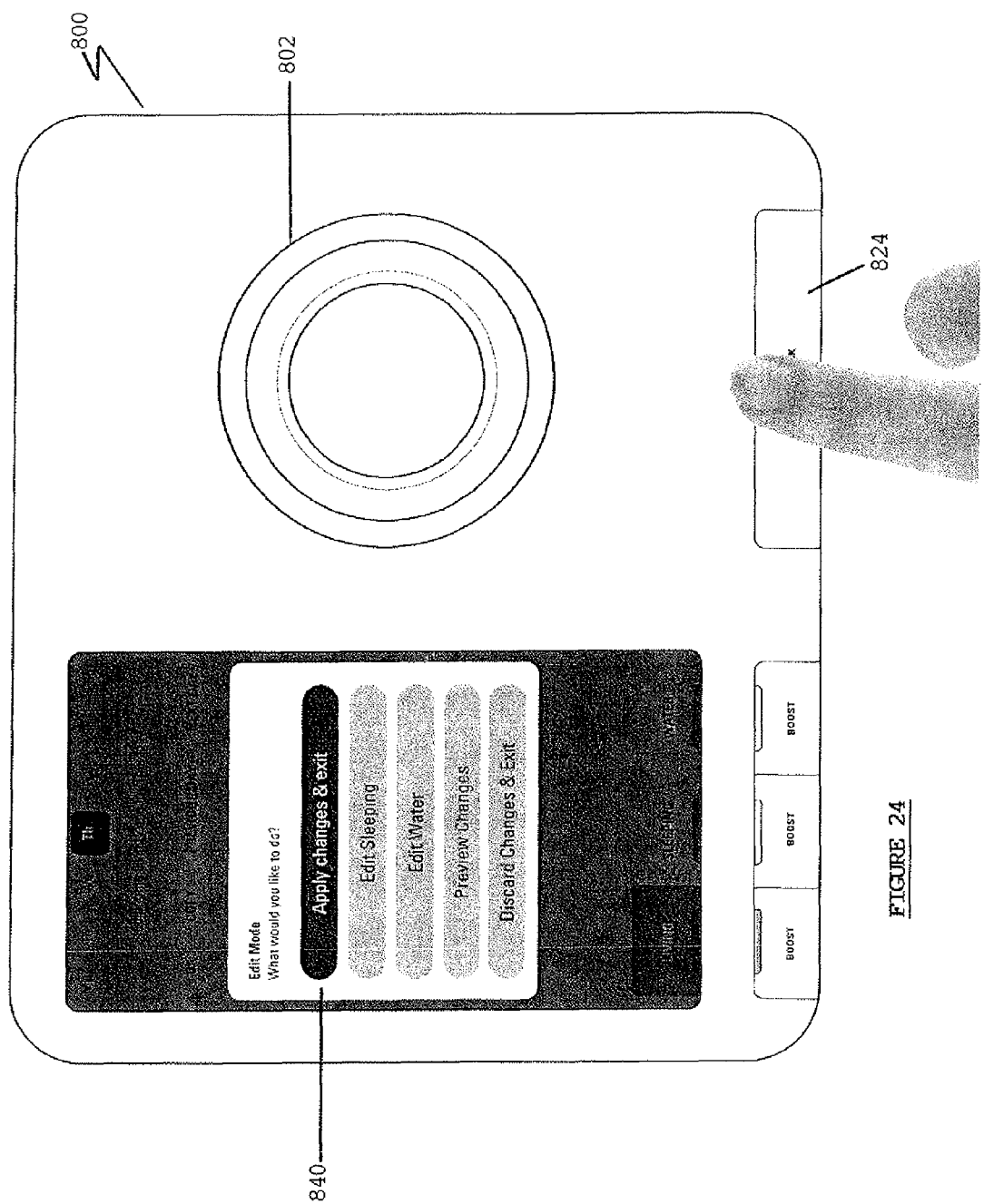

As shown in FIG. 24, when finished editing, the user presses Menu/Back to exit the exit mode. When this button is pressed a dialog box 840 opens, declaring that changes have been made to the schedule in question. The user must choose to Apply or Discard the changes before leaving the edit screen.

Editing an existing time period may also be carried out by the device. When Edit mode has been entered a cursor appears on the clock dial and turning the wheel moves this cursor around this clock. If a user wishes to edit the time period which runs from 06.15 until 08.30 then the user rotates the scroll wheel clockwise moves the cursor towards this desired section. When the cursor reaches the grab handle at the edge of the desired of the section the handle highlights in a darker grey colour. To move the handle the user must press and turn the wheel simultaneously, increasing or decreasing the duration of the section in question. To assign any change made, the user releases the wheel once again, dropping the handle at the desired segment.

As described above with respect to FIG. 24 when finishing editing, the user presses Menu/Back to exit the edit mode, when this button is pressed a dialog box opens, declaring that changes have been made to the schedule in question. The user must choose to Apply or Discard the changes before leaving the Edit screen.

Deleting an existing time period may also be carried out by the device. As in the Edit mode described above, to delete a section or portion of a section the user rotates the scroll wheel to move the active cursor towards a desired section or time period to be deleted. When the cursor reaches the grab handle at the edge of the desired section the handle highlights in a darker grey colour. An "X" appears outside the clock to indicate that this section can be deleted by clicking the wheel. Upon pushing the wheel, screen reverts to the Edit screen, albeit minus the section just deleted. When finished deleting, the user presses Menu/Back to exit the edit mode. When this button is pressed, a dialog box opens, declaring that changes have been made to the schedule in question. The user must choose to apply or discard the changes before leaving the Edit screen.

In order to provide the ability to assign, copy settings and navigate through days once editing of a specific zone has begun, secondary navigation functionality is available. To access these links, the user operates the wheel to scroll the cursor past 12 o'clock on the clock dial. A "Copy" option allows users to copy the settings shown on screen to other days of the week. The functionality works in a similar fashion to that of the current iPhone app. A "Preview Changes" option allows users to get an overview of a weekly schedule before applying their changes. In order to achieve this feature an "Overview Screen" is introduced. The user can navigate by day, with an overview given by the three clocks. Pressing the wheel will return them to the Edit Options and allow them to continue editing or apply the changes.

Figure 25:
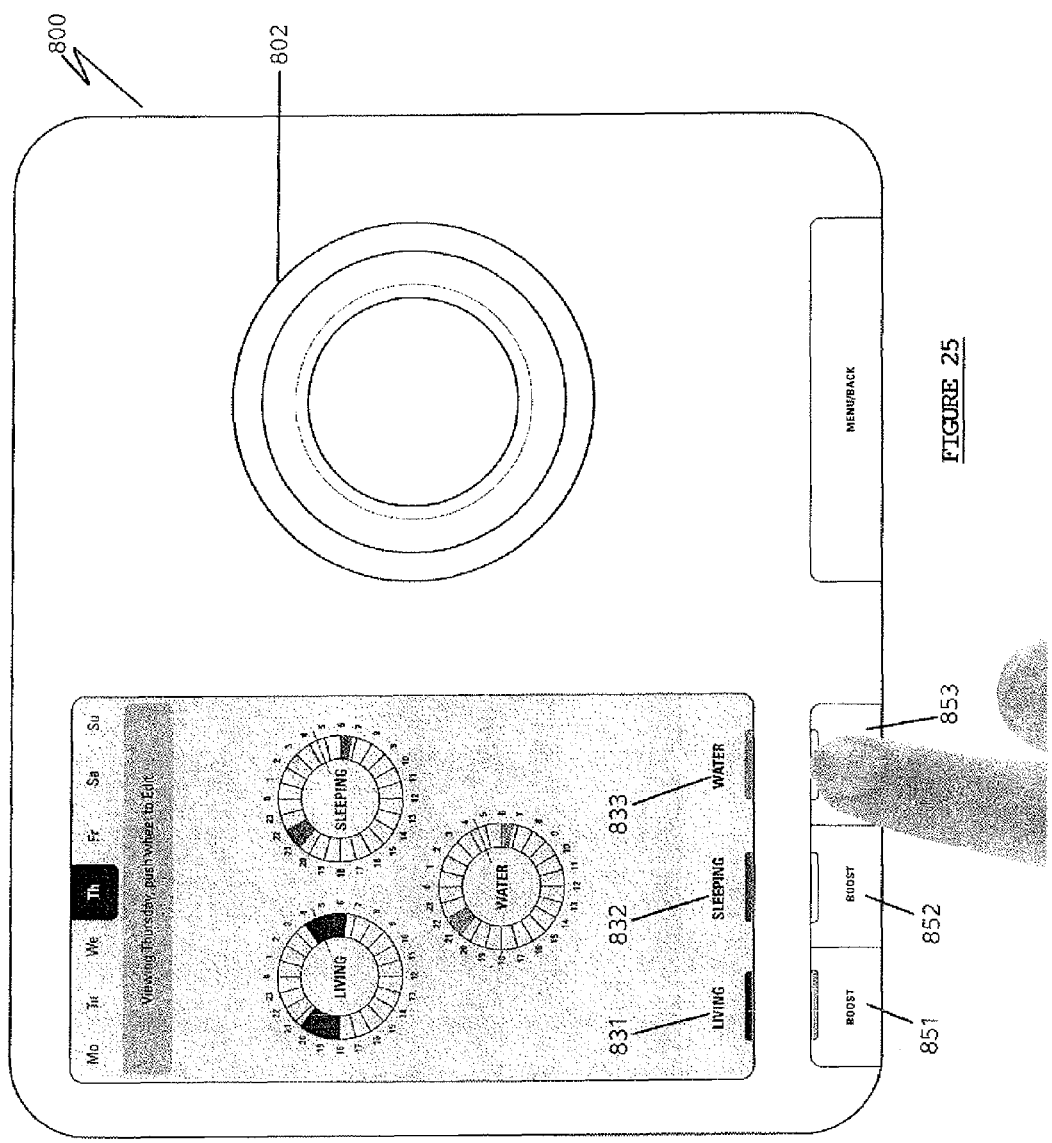
Figure 26:
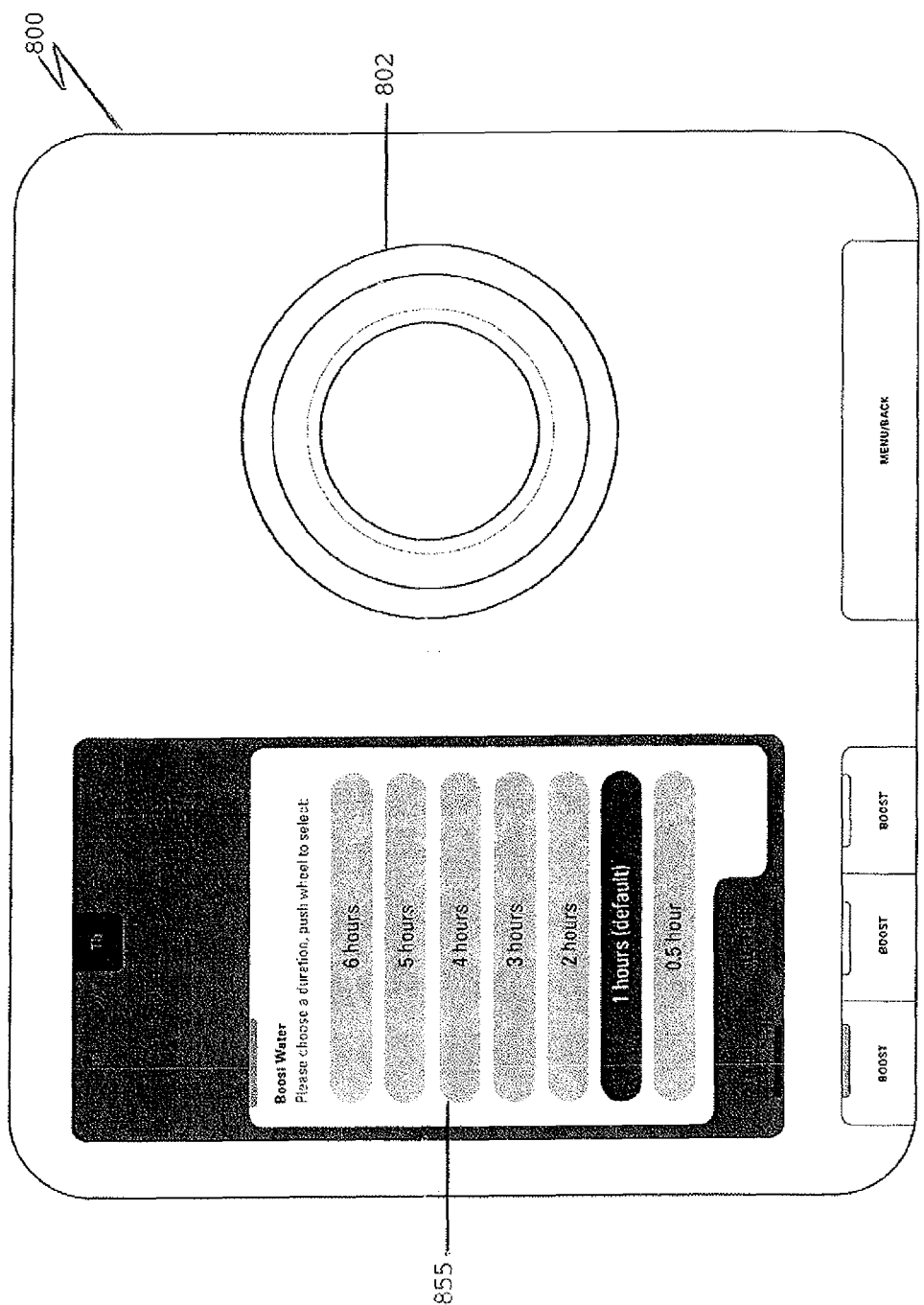

FIG. 25 shows three dedicated hardware 'boost' buttons 851, 852, 853 corresponding to each zone 831, 832, 833 on the front face of the device 800. Pushing a 'boost' button opens a boost dialog box 855 (as shown in FIG. 26) over the previous screen, regardless of what that previous screen was. This dialog box 855 displays the zone 851, 852, 853 in question, and gives multiple options as to the duration of Boost to be activated. By default, Boost is set to 1 hour. If the user presses boost once and walks away, it will activate for this time period.

Figure 27:
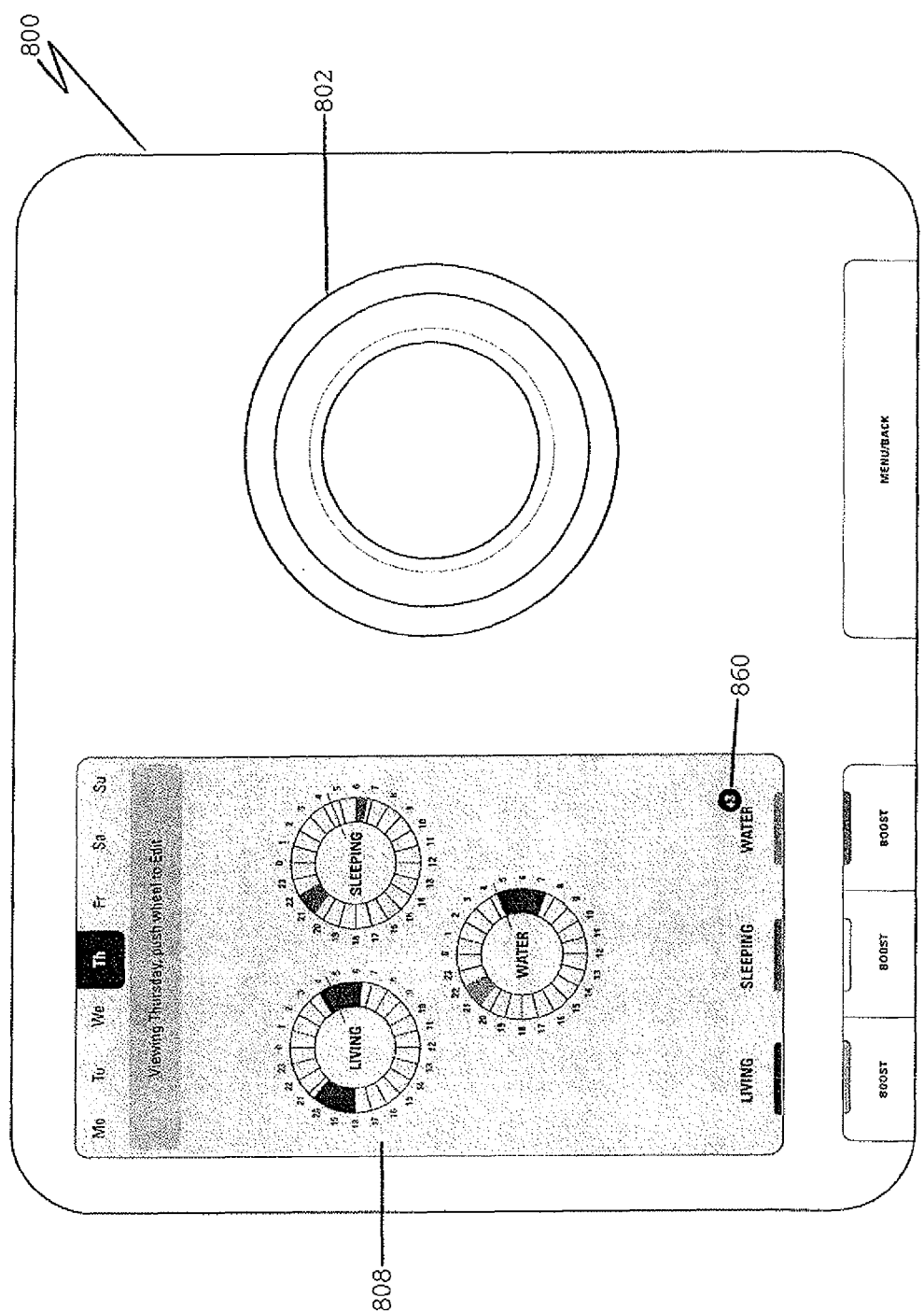

In the instance shown in FIG. 26, the user has selected to activate boost for 3 hours. The presence of boost is obvious both on the display and through the LED's. As shown in FIG. 27, the overview screen shows an added section in red, highlighting the boost period. A small "+3" icon 860 appears over the water zone tab 833, and the LED over the zone in question lights in red to communicate the active boost. In order to cancel an active boost session, the boost dialog must be reopened by pressing the boost button in question. When this is pressed, a dialog box appears giving the user options to disable the current boost or cancel the action.

A further feature is referred to as "Advance Off" and is a function to give the user an option to manually switch off an active zone which has been activated due to the clock. As described previously, the LED glows when a zone is active due to the clock. When this is the case, the boost button becomes an "Advance Off" button. Pressing the boost button, activates this function. By default, the "Advance Off" function will switch off a zone until the next scheduled active section. Pressing the button once and walking away from the device will default to this setting. If the user wishes to select a different "Advance Off" setting they can do so at the screen above. When active, the "Advance Off" feature is shown on the Overview Screen with an icon over the zone name in question. The active section is greyed out on the clock display.

Figure 28:
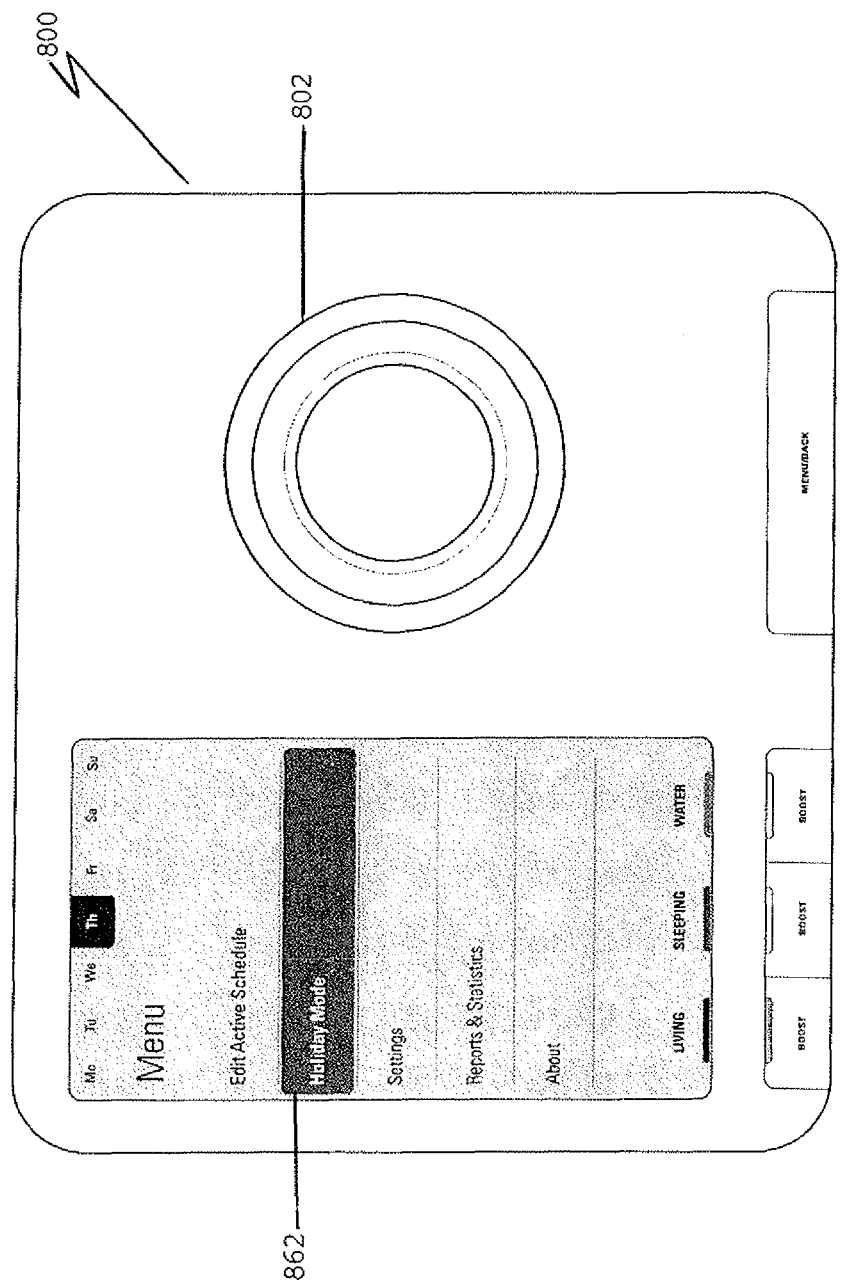

As shown in FIG. 28, other secondary functions, such as Holiday Mode, are accessed via the Menu. This is a text based linear menu, designed to be adaptable to the needs of increased functionality in future versions. Pushing the Menu button from the Overview screen enters the Menu and displays a list of sub menus, organised with the most important/commonly used to the top. Turning the scroll wheel cycles through this menu while pressing Menu again exits the menu screen. Pressing the on Holiday Mode icon 862 enters the Holiday sub menu shown above. The user is given options to activate or disable (if active). The Holiday Mode menu offers the option to select how many days the user wishes to activate Holiday Mode for. As is the case with applying changes to schedules, a dialog box appears to confirm/cancel the Holiday Mode just configured. Once activated, the Overview screen is stripped of any active sections, any an information tip explaining the Holiday Mode is active is displayed.

It is to be understood that the invention is not limited to the specific details described above which are given by way of example only, and that various modifications and alterations are possible without departing from the scope of the invention as defined in the appended claims.

The invention claimed is:
1. A user interface system for programming schedules of a programmable device, the user interface system comprising:
processor means;
a display unit coupled to the processor means;
wherein the processor means configured to provide a graphical display on the display unit;
a time select region for programming on and off time periods for a water heating schedule and a room temperature schedule,
characterised in that the time select region is displayed on the display unit as at least two dials, each representing at Rill twenty-four hour day, in which one of the at least two dials is configured for setting the water heating schedule and the other of the at least two dials is configured for setting the room temperature schedule, in which each dial is divided into a plurality of individual segments, each individual segment representing a specific programmable period of time in the twenty-four hour period of time for the respective water heating schedule and the room temperature schedule;
wherein the time select region is interactively operable to enable a user to select one or more segments on each dial to program the respective water heating schedule and the room temperature schedule, in which a selected segment triggers an on-time period of a respective one of the water heating schedule and the room temperature schedule and an unselected segment triggers an off-time period of a respective one of the water heating schedule and the room temperature schedule, and
one or more segments of each dial are selected by a user positioning and dragging pointing means over unselected segments of the dials and segments are deselected by a user positioning and dragging pointing means over selected segments of the dials,
wherein the processor means is further configured to display graphically on the display unit a temperature setting region which is interactively operable to enable a target temperature to be set for a time period set by a user for the schedules; and wherein the schedules are programmable by accessing the user interface system via an Internet website, via an application executing on a mobile computing device, and/or via a control panel for the device.

2. The user interface system as claimed in claim 1, in which the pointing means is provided by a manually rotatable selection device which is located beside the dials on the control panel for the programmable device, and segments of the dial are selected or deselected by a user positioning, activating and dragging a pointer of the manually rotatable selection device over segments of the dials and pushing the manually rotatable selection device to complete the selection or deselection of the segments of the dials.

3. The user interface system as claimed in claim 1, in which the display unit is a touch sensitive screen and the pointing means is provided by a finger of a user or a stylus such that segments are selected or unselected by a user touching and dragging the finger or stylus over segments of the dials.

4. The user interface system as claimed in claim 1, in which the pointing means is a mouse and segments are selected or unselected by a user positioning, activating and dragging a mouse pointer over segments of the dials.

5. The user interface system as claimed in claim 1, in which each segment has a background colour or appearance which indicates a time of use price for the operating parameter.

6. The user interface system as claimed in claim 1, in which the segments change appearance when selected and deselected.

7. The user interface system as claimed in claim 1, in which each segment of a dial corresponds to a specific period of time within the range of one of: one hour to twenty-four hours of a day, thirty minutes to an hour of a day, fifteen minutes to thirty minutes of a day and one minute to fifteen minutes of a day.

8. The user interface system as claimed in claim 1, in which the time select region is operable for programming a plurality of on-time periods in a day on the time select region for the water heating schedule and the room temperature schedule, whereby each distinct on-time period corresponds to adjacent selected segments on the dials.

9. The user interface system as claimed in claim 1, in which a time period is additionally displayed on each dial in a numerical format on the display unit.

10. The user interface system as claimed in claim 9, in which a time period in the numerical format is displayed as a start and stop time on each dial on the display unit.

11. The user interface system as claimed in claim 10, in which a time period is updated by editing the start and stop time on the numerical format.

12. The user interface system as claimed in claim 11, in which segments of the dials are selected or deselected according to the edited time period.

13. The user interface system as claimed in claim 1, in which the target temperature and current temperature are displayed in or adjacent the dials.

14. The user interface system as claimed in claim 1, in which the processor means is further configured to display graphically on the display unit a day select region which is interactively operable to enable a user to select one or more days in a week for which a schedule is to be programmed.

15. The user interface system as claimed in claim 1, in which schedules are displayed as individual dials for each day of a week on the display unit.

16. The user interface system as claimed in claim 1, in which the processor is coupled to local or remote storage means, whereby one or more programmed water heating schedule and room temperature schedule are stored in and selectable from the storage means for processing by the device.

17. A method of programming schedules of a programmable device using a user interface system having a processor means and a display unit coupled to the processor means, the processor means configured to provide a graphical display on the display unit including an interactively operable temperature setting region and a time select region for programming on and off time periods for a water heating schedule and a room temperature schedule, the time select region displayed on the display unit as at least two dials representing a full twenty-four hour day, in which one of the at least two dials is configured for setting the water heating schedule and the other of the at least two dials is configured for setting the room temperature schedule, in which each dial is divided into a plurality of individual segments, each individual segment representing a specific programmable period of time in the twenty-four hour period of time for the respective water heating schedule and the room temperature schedule, the time select region is interactively configured to enable a user to select one or more segments on each dial to program the water heating schedule and the room temperature schedule, in which a selected segment triggers an on-time period of a respective one of the water heating schedule and the room temperature schedule and an unselected segment triggers an off-time period of a respective one of the water heating schedule and the room temperature schedule, the method comprising the steps of:

selecting and deselecting one or more segments on each dial to program the water heating schedule and the room temperature schedule, wherein the step of selecting segments of the dials involves a user positioning and dragging pointing means over selected segments of the dials and the step of deselecting segments of the dials involves a user positioning and dragging pointing means over selected segments of the dials, setting a target temperature for a time period set by a user on the interactively operable temperature setting region displayed graphically on the display unit by the processor means, and programming the schedules by accessing the user interface system via an Internet website, via an application executing on a mobile computing device, and/or via a control panel for the device.

18. The method of programming schedules of a programmable device as claimed in claim 17, in which the pointing means is provided by a manually rotatable selection device which is located beside the dials on the control panel for the programmable device, and the step of selecting or deselecting segments involves a user positioning, activating and dragging a pointer of the selection device over segments of the dials and pushing the selection device to complete the selection or deselection of the segments of the dials.

19. The method of programming schedules of a programmable device as claimed in claim 17, in which the display unit is a touch sensitive screen and the pointing means is a finger of a user or a stylus, and the step of selecting or deselecting segments involves a user touching and dragging the finger or stylus over segments of the dials.

20. The method of programming schedules of a programmable device as claimed in claim 17 in which the pointing means is a mouse and segments are selected or deselected by a user positioning, activating and dragging a mouse pointer over segments of the dials.

21. The method of programming schedules of a programmable device as claimed in claim 17, comprising a further step of programming a plurality of distinct on-time periods in a day on the time select region for the water heating schedule and the room temperature schedule, whereby each distinct time period corresponds to adjacent selected segments on the dials.

22. The method of programming schedules of a programmable device as claimed in claim 17, comprising a further step of editing a start and stop time for a time period on a numerical format additionally displayed on each dial.

23. The method of programming schedules of a programmable device as claimed in claim 17, comprising a further step of selecting one or more days in a week for which the water heating schedule and the room temperature schedule are to be programmed by interacting with a day select region displayed graphically on the display unit.

24. The method of programming schedules of a programmable device as claimed in claim 17, comprising a further step or selecting as water heating schedule and a room temperature schedule from local or remote storage means for processing by the device.

\* \* \* \* \*